US00RE39326E

(19) United States
(12) Reissued Patent
Comer et al.

(10) Patent Number: US RE39,326 E
(45) Date of Reissued Patent: Oct. 3, 2006

(54) METHOD AND APPARATUS FOR SUGGESTING COMPLETIONS FOR A PARTIALLY ENTERED DATA ITEM BASED ON PREVIOUSLY-ENTERED, ASSOCIATED DATA ITEMS

(75) Inventors: Ross Ward Comer, Bothell, WA (US); Adam Brett Stein, Bellevue, WA (US); David Russell Williams, Jr., Issaquah, WA (US)

(73) Assignee: Microsoft Corporation, Redmond, WA (US)

(21) Appl. No.: 09/728,000

(22) Filed: Dec. 1, 2000

Related U.S. Patent Documents

Reissue of:
(64) Patent No.: 5,845,300
Issued: Dec. 1, 1998
Appl. No.: 08/658,798
Filed: Jun. 5, 1996

(51) Int. Cl.
*G06F 17/27* (2006.01)

(52) U.S. Cl. ..... 707/508

(58) Field of Classification Search ..... 715/503–508, 715/811; 707/100–101, 104.1
See application file for complete search history.

(56) References Cited

U.S. PATENT DOCUMENTS 5,495,565 A * 2/1996 Millard et al. ..... 707/506
5,640,577 A * 6/1997 Scharmere ..... 707/507
5,666,502 A * 9/1997 Capps ..... 345/811
5,682,538 A * 10/1997 Lemire et al. ..... 707/507
5,745,712 A * 4/1998 Turpin et al. ..... 345/763

OTHER PUBLICATIONS

Smith, Do It Yourself Database, MacUser, v.9, n.11, p. 126(8), Nov. 1993.*
Sullivan, Intuit's Upgrade Quickens Pace of Personal Finance, MacWeek, v.7, n.29, p. 52(2), Jul. 19, 1993.*
EDGE, Personal Finance: Quicken Adds Over 100 Improvements, EDGE, v.3, n.121, p. 7(1), Sep. 14, 1992.*
Novell, Quattro Pro User Guide. p. 47–49, 1994.*
Quicken Version 5 for Windows, manufactured by Intuit, Inc. It is Applicants understanding that this product provides an automatic entry for data items in a fixed data structure environment. Based on the Copyright notice of 1985–1995, this reference may have been available for purchase more than 1 year prior to the filing date of Jun. 5, 1996. (4 pages).*
Microsoft Access for Windows '95, manufactured by Microsoft Corporation. It is Applicants understanding that this product provides automatic capability for selecting data entries from a pre–defined or fixed list. Based on the Copyright notice of 1989–1995 this reference may have been available for purchase more than 1 year prior to the filing date of Jun. 5, 1996. (4 pages).*

(Continued)

*Primary Examiner*—Sanjiv Shah
(74) *Attorney, Agent, or Firm*—Merchant & Gould P.C.

(57) ABSTRACT

A system for improving the efficiency and reliability of entering data into a database or spreadsheet computer program by providing suggested completions to the data entry operator. The operator invokes an edit mode (200) for a particular data area and a dynamic list of possible completions is generated (210) based on other data items associated with the edited data area. The list of possible completions is dynamic because it changes to reflect the status of the current data within the database or spreadsheet. As the operator enters characters of a data item (220), the list of completed data items is searched for an entry that matches the entered data item (230). If a match is found then the matching item is displayed to the data entry operator as a suggested completion (240). The data entry operator can then elect to accept the suggested completion (250) or to continue entering the data item.

60 Claims, 17 Drawing Sheets

OTHER PUBLICATIONS

Microsoft Money Version 3.0. Manufactured by Microsoft Corporation. It is Applicant's understanding that this product contains an automatic data entry feature, and has been available for purchase more than 1 year prior to the filing date of Jun. 5, 1996. (no pages).*

* cited by examiner

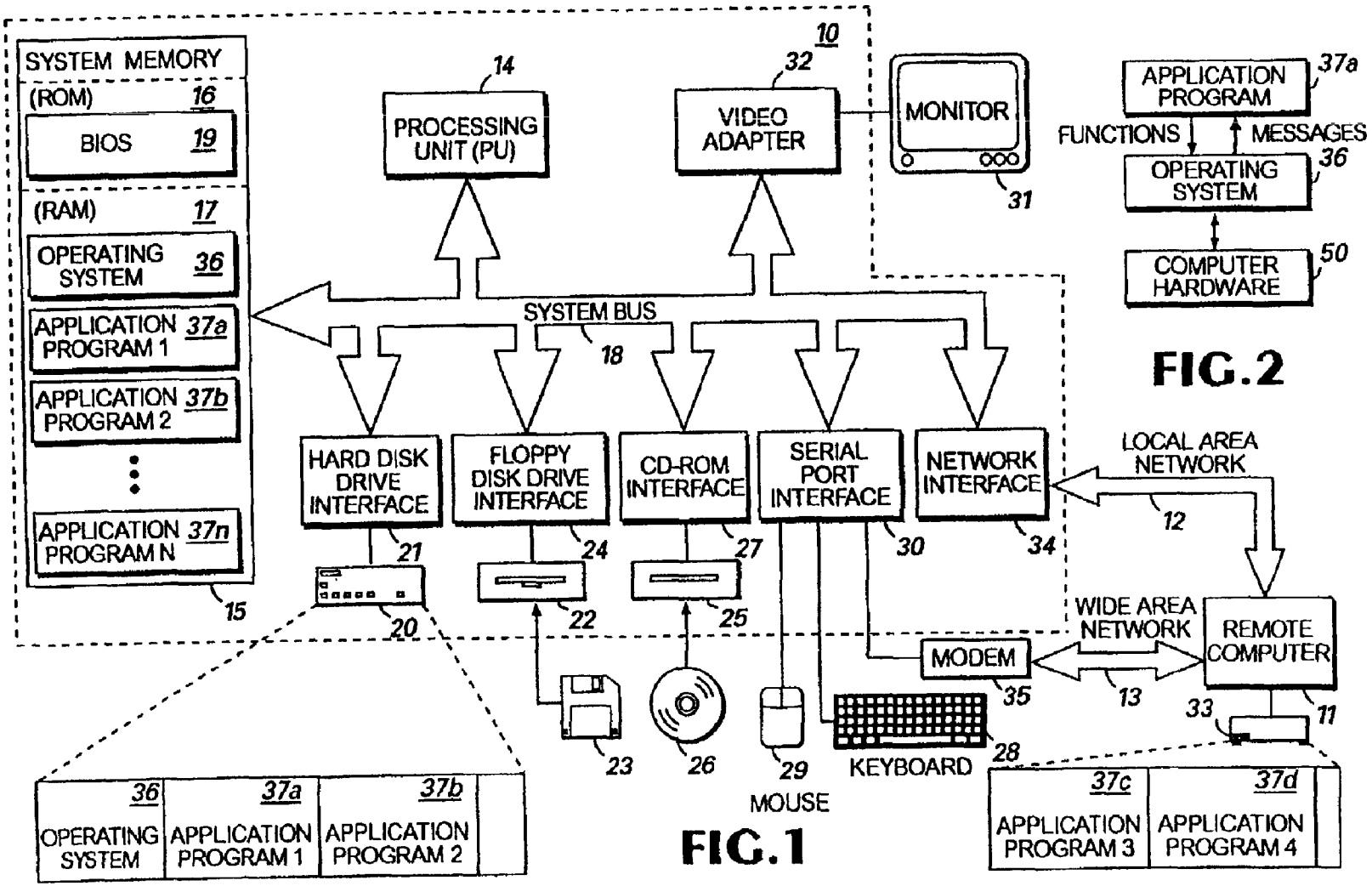
APPLICATION PROGRAM
37a
MESSAGES
36
OPERATING SYSTEM
50
COMPUTER HARDWARE
FUNCTIONS
FIG. 2
LOCAL AREA NETWORK
12
REMOTE COMPUTER
11
33
WIDE AREA NETWORK
13
37d
APPLICATION PROGRAM 4
37c
APPLICATION PROGRAM 3
MONITOR
31
NETWORK INTERFACE
34
MODEM
35
28
KEYBOARD
10
32
VIDEO ADAPTER
SERIAL PORT INTERFACE
30
29
MOUSE
CD-ROM INTERFACE
27
25
26
SYSTEM BUS
18
FLOPPY DISK DRIVE INTERFACE
24
22
23
14
PROCESSING UNIT (PU)
HARD DISK DRIVE INTERFACE
21
20
37b
APPLICATION PROGRAM 2
37a
APPLICATION PROGRAM 1
36
OPERATING SYSTEM
SYSTEM MEMORY
16
(ROM)
BIOS
19
17
(RAM)
OPERATING SYSTEM
36
APPLICATION PROGRAM 1
37a
APPLICATION PROGRAM 2
37b
APPLICATION PROGRAM N
37n
15
FIG. 1

| Year | American League | | Score | National League |
|---|---|---|---|---|
| 1996 | | | | |
| 1995 | Indians | 2 | 4 | Braves |
| 1993 | Blue Jays | 4 | 2 | Phillies |
| 1992 | Blue Jays | 4 | 2 | Braves |
| 1991 | Twins | 4 | 3 | Braves |
| 1990 | A's | 0 | 4 | Reds |
| 1989 | A's | 4 | 0 | Giants |
| 1988 | A's | 1 | 4 | Dodgers |
| 1987 | Twins | 4 | 3 | Cardinals |
| 1986 | Red Sox | 3 | 4 | Mets |
| 1985 | Royals | 4 | 3 | Cardinals |
| 1984 | Tigers | 4 | 1 | Padres |
| 1983 | Orioles | 4 | 1 | Phillies |
| 1982 | Brewers | 3 | 4 | Cardinals |

| Year | American League | | Score | | National League |
|---|---|---|---|---|---|
| 1996 | Indians | 2 | 4 | | Braves |
| 1995 | Blue Jays | 4 | 2 | | P |
| 1993 | Blue Jays | 4 | 2 | | Braves |
| 1992 | Twins | 4 | 3 | | Braves |
| 1991 | A's | 0 | 4 | | Reds |
| 1990 | A's | 4 | 0 | | Giants |
| 1989 | A's | 1 | 4 | | Dodgers |
| 1988 | Twins | 4 | 3 | | Cardinals |
| 1987 | Red Sox | 3 | 4 | | Mets |
| 1986 | Royals | 4 | 3 | | Cardinals |
| 1985 | Tigers | 4 | 1 | | Padres |
| 1984 | Orioles | 4 | 1 | | Phillies |
| 1983 | Brewers | 3 | 4 | | Cardinals |
| 1982 | | | | | |

METHOD AND APPARATUS FOR SUGGESTING COMPLETIONS FOR A PARTIALLY ENTERED DATA ITEM BASED ON PREVIOUSLY-ENTERED, ASSOCIATED DATA ITEMS

Matter enclosed in heavy brackets [ ] appears in the original patent but forms no part of this reissue specification; matter printed in italics indicates the additions made by reissue.

TECHNICAL FIELD

The present invention relates generally to the field of computer-based applications requiring data entry and more particularly to the field of improving the data entry process by automatically completing a partially entered data item with a matching data item from a list of previously entered data items.

BACKGROUND OF THE INVENTION

In the field of data processing systems, data is entered into databases for the purposes of rapid searching, retrieving or processing. Since its inception, the field of data processing has been bottle-necked by the time consuming and human-error prone process of data entry. Therefore, it is desirable to improve the efficiency and reliability of entering data into a database system. One method to achieve this objective is the use of automatic completion algorithms to assist in the data entry process. Automatic completion algorithms generally refer to the technique of comparing a partially-entered data item to a list of possible completed data items to find a suggestion for completing the partially-entered data item. Automatic completion algorithms improve the data entry process by increasing the speed and integrity of data entry. For instance, a user is only required to enter enough characters of a data item to uniquely identify a suggested completion. This results in increasing the speed of data entry by reducing the number of required key strokes. For larger data items, the savings in time can be quite noticeable. Concerning the increase in data integrity, by providing suggested completions, many of the human errors such as spelling errors and data anomalies can be eliminated from the process of data entry.

Data processing systems can take on many forms ranging from highly-formatted, custom or specialized database programs to a more generic, user-definable database, such as a spreadsheet application. Examples of the former include products such as inventory control systems, manufacturing tracking systems and accounts receivable/payable systems. An example of a more generic database is the "MICROSOFT EXCEL" computer spreadsheet program marketed by Microsoft Corporation.

Automatic data entry completion algorithms have appeared in various types of applications. For example, the help utility in "MICROSOFT WORD" for "WINDOWS 95", version 7.0, provides an automatic completion feature for retrieving help information from a database. An alphabetically sorted list of predefined topics are available as an index into the information database. When entering a word or words describing the type of information required (i.e., entering "acc" to obtain information concerning "accented characters") the automatic completion feature will search the list for a matching entry. If a suggested completion is identified, it will be displayed to the user.

Microsoft's "ACCESS" database program, version 7.0, is an example of a more generic, user definable database that provides an automatic completion feature to aid in defining database tables. The "Table Definition" interface consists of the predefined categories: Field Name, Data Type and Description. When entering data items into the Data Type category, a predefined list of suggested completions is examined to determine if a match for the data item being entered (partial data entry) exists. If a match is found, the matching data item is displayed as a suggested completion. Similar to Microsoft's "WORD" program, "ACCESS" relies on the characteristic of the data items conforming to a pre-defined list of possibilities.

For the other categories in the "Table Definition" interface of "ACCESS", the data entries are user-definable as opposed to being selected from a pre-defined list. Here, no suggested completions are provided when entering data into these categories. Furthermore, once a database table has been defined, the user can enter data into the user-defined data categories of the database table. In this interface, "ACCESS" again does not provide an automatic completion feature.

A characteristic of each of the above-described automatic completion algorithm implementations is that they operate within a rigidly defined database structure. These implementations take advantage of the fact that the format and contents of the data being entered are known, and hence, a pre-defined list of suggestions can be utilized. Both of these implementations improve the efficiency and reliability of data entry in a fixed or structured database by allowing the use of an automatic completion algorithm. But, in more generic databases, such as a spread sheet, the user is at complete liberty to define the categories and types of data that can be entered. There is a need for a system to provide efficient and reliable data entry for user-definable database systems. Therefore, there is a need for a system for generating a list of completed data items in a generic database that allows the use of an automatic completion feature and hence, that provides a more efficient an reliable method for entering data into a generic database.

Implementing an automatic completion feature for the process of entering user-definable data posses several technically complicated issues. The implementation must be able to: (1) modify the selection list as new data items are entered and update the selection list when previously entered items are modified; (2) minimize the impact of the selection lists on system resources such as memory; and (3) minimize any delays in processing user inputs. Because entering user-definable data is a process requiring efficient and reliable data entry, there is a need for an automatic completion capability for generic, user-definable, data entry systems.

In view of the foregoing, there is a need for an automatic completion method that can be used for generic, spreadsheet type applications in which the structure of the database and the types of data entered can take on a multiplicity of formats. There is also a need for a method to dynamically generate a list of suggested completions that would be based on data items having an association with the data item being entered rather then utilizing a static list of predefined possible data items.

SUMMARY OF THE INVENTION

The present invention satisfies the above-described needs by providing an automatic completion of a partial data entry by examining a suggested completion list, which is generated upon the entry of the data item. The list of suggested completions is based on the contents of other data entries that are associated with the item being entered. The present invention allows for efficient and reliable data entry in a generic, user-definable, database application.

Generally, the present invention enhances the user interface of a data entry application for a database by providing suggested completions of partially entered data items from a dynamically generated list of possible completions. The operation of the present invention includes generating the completed data item list from data entries that are associated with the partial data entry, comparing the completed data item list to the partially entered data item, and automatically completing the entry of the data if a unique match is found. From the user's perspective, when an item is being entered into the database, associated entries within the database will be examined to determine if a matching entry has been previously entered. This examination will be performed by utilizing a character mask. Thus, when a user enters the first character of an item, if there is an item in the database that uniquely matches the first character, then the partial entry will be automatically completed and the user will have the opportunity to accept the suggested completion.

The implementation of the present invention is uniquely suitable for a generic database accepting user-definable data items. Furthermore, the present invention is an automatic completion system that is able to: (1) modify the completion list as new data items are entered and update the selection list when previously entered items are modified; (2) minimize the impact of the completion lists on system resources such as memory; and (3) minimize any delays in processing user inputs.

First, the present invention modifies the completion list as new data items are entered and updates the completion list when previously entered items are modified. This is accomplished by using a dynamic completion list that is defined by the context of the data within the database as opposed to pre-defined values. The completion list is generated from a set of data within the database that is associated with the data item being entered, and reflects the status of the database at the time the data item is being entered. The benefits associated with this aspect of the invention include: providing a completed data item list that is automatically updated to reflect the current contents of the database; providing a completed data item list that is not encumbered by extraneous data entries that have no relationship with the item being entered; and providing an automatic completion feature that is not restricted to the use of a limited list of possible completions (i.e., a predefined data set).

A unique aspect of the generation process includes defining which data items are associated with the data item being entered. In the context of a generic database, the present invention provides several methods to perform this process. Generally, data items that fall within the same category or a similar category to the data item being entered are considered to be associated data items. Therefore, an advantage of the present invention is the ability to define which data entries within a database are related to a data item being entered, to generate a list of suggested completions based on these associated data entries, and to provide a dynamic completion list which tracks the actual contents of the database.

Another aspect of the present invention is that the completed data item list can be filtered so that data items which do not benefit the automatic completion feature are eliminated from the list. This is especially beneficial in a generic database where the nature of the database allows for a mixture of data types within associated categories. For instance, a generic database may allow for numeric entries and text entries to be entered into the same database category. An example of such a category would be a library database, which combines the category that lists the name of the person a book is checked out to, and the category indicating the number of days that the book has been on the shelf without being checked out. The second category is used to determine if the book should be removed from the shelves and placed into the archives. In this scenario, the numeric entries for the days on the shelf could be filtered from the completed data item list. The benefits derived from this ability is that the list is not encumbered with extraneous numeric entries which could result in slowing down the list generation process, and the entry of numeric data will not trigger any automatic completions which could easily result in entering invalid data (i.e., having the entry "1" automatically complete to "100"). Therefore, another advantage of the present invention is the provision of a technique for filtering out non-useful items from the list of suggested completions in order to maximize the efficiency of an automatic completion feature.

Second, the present invention minimizes the impact of the completion lists on system resources such as memory by storing the completed data item list in a dynamic data structure. In contrast to a static data item list, a dynamic list does not require permanent memory resources. Once a data item has been entered into the database and accepted by the user, the memory occupied by the data item list can be released and reallocated to other resources. The efficient use of memory resources is necessary in a database system, and thus, the minimization of overhead memory is imperative. This is increasingly important in a generic database that does not have pre-defined data types, and therefore, can not obtain the benefit of using efficient memory storage schemes which take advantage of pre-defined data types. Advantageously, the present invention provides a list of suggested completions which makes efficient use of memory storage.

Third, the present invention minimizes any delays in processing user inputs by using a tiered technique to generate the completed data item list. This tiered technique includes generating the completed data item list one section at a time, allowing for input processing in between the generation of each section. In addition, a suggested completion can be provided to the user based on a partially generated list. This is beneficial because it provides virtually immediate feedback to the user and expedites the data entry process. Therefore, another benefit of the present invention is the generation of a list of suggested completions in a manner that minimizes the impact to data input processing and provides instantaneous responses to the user.

More specifically described, the present invention is an automatic completion feature that can be implemented in a spreadsheet application. When a user begins to edit a cell within a spreadsheet, a completed data item list is generated from the previously entered data items stored in cells associated with the edited cell. As the user enters characters into the cell, the completed data item list is searched for an entry corresponding to the partial data entry in the edited cell. If a qualifying match is found, then the data item is displayed as a suggested completion within the cell being edited. The user then has opportunity to accept the suggested completion and thereby accelerate the data entry process, to enter additional characters to define a new data entry in the spreadsheet, or to reject the suggested completion. By accepting the suggested completion, the benefit of increasing the speed of data entry is realized and the integrity of the entered data is assured (i.e., the data entry is in conformance with previously entered data). Therefore, it is a further advantage of the present invention to improve the efficiency and reliability of data entry in a spreadsheet by providing the ability for an automatic completion feature utilizing a list of completed data items stored in cells associated with a cell being edited.

These and other aspects, features, and advantages of the present invention will be more clearly understood and appreciated from a review of the following detailed description of the present invention and possible embodiments thereof, and by reference to the appended drawings and claims.

BRIEF DESCRIPTION OF THE DRAWINGS

FIG. 1 is a block diagram of a personal computer that provides the operating environment for the preferred embodiment of the present invention.

FIG. 2 is a block diagram illustrating the interface between a computer's input/output devices, an operating system, and an application program.

FIGS. 3a–j are diagrams illustrating display screens from the "MICROSOFT EXCEL" for "WINDOWS 95" spreadsheet application and are illustrative of an embodiment of the present invention.

DETAILED DESCRIPTION

Figure 3A:
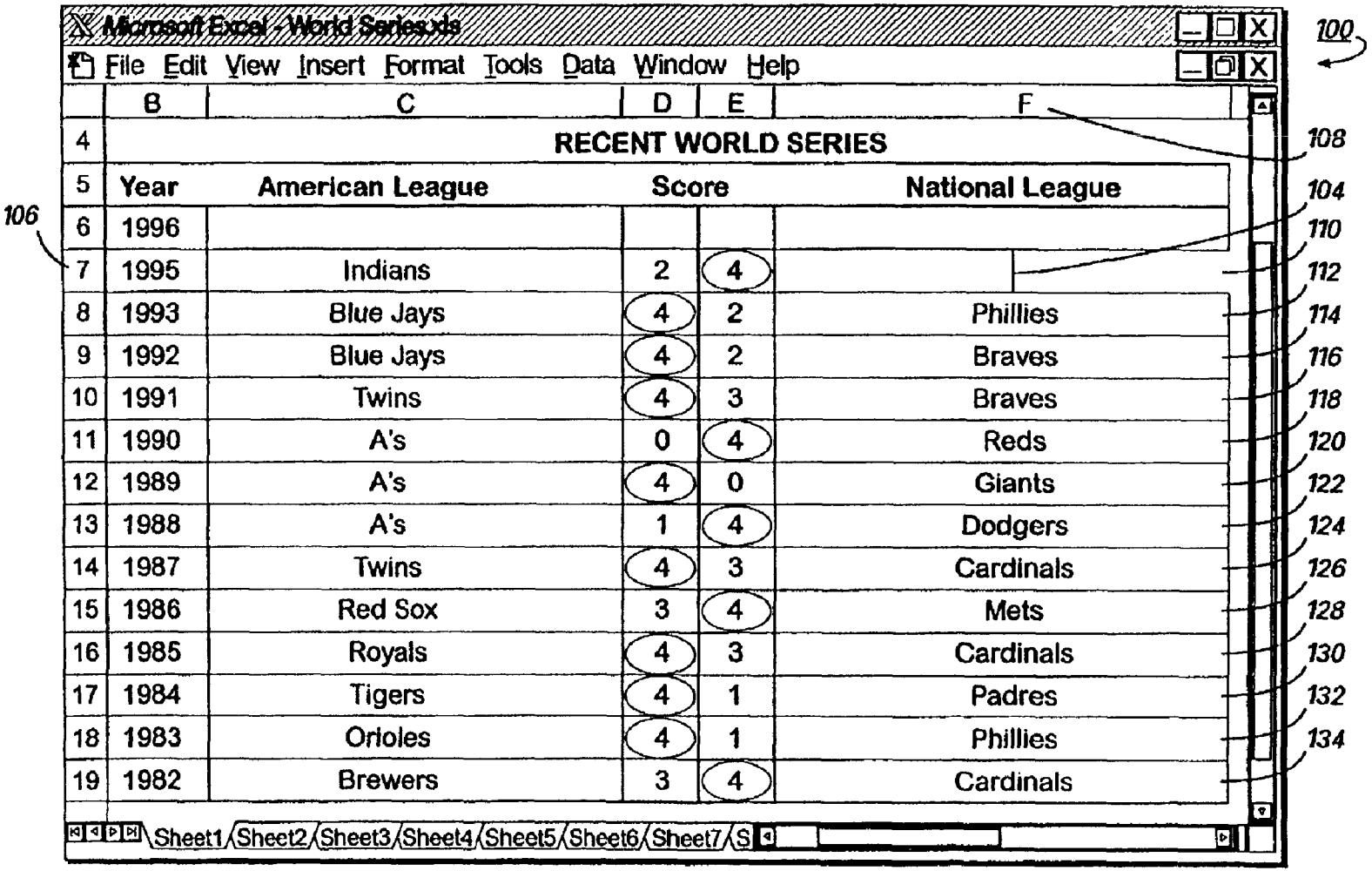

The present invention provides an automatic completion capability for generic databases containing user-defined data entries. The preferred embodiment of the present invention is represented by the "WINDOWS 95" version of the "MICROSOFT EXCEL" program, a spreadsheet program published by Microsoft Corporation of Redmond, Wash. Briefly described, the preferred program allows users to enter user-defined data into a generic database in an efficient and reliable manner. This is accomplished by providing an automatic completion feature which utilizes a dynamically generated completion list based on data items within the database that are associated with the data being entered.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a processing unit (PU), memory storage devices for the PU, display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the PU via a communications network.

The processes and operations performed by the computer include the manipulation of signals by a PU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, flags, variables, parameters, objects, properties, tags, types, identifiers, values, elements, symbols, characters, terms, numbers, points, records, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, receiving, sending, transmitting, replying, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

The Operating Environment

FIG. 1 illustrates a conventional personal computer 10 suitable for supporting the operation of the preferred embodiment of the present invention. As shown in FIG. 1, the personal computer 10 may operate in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a processing unit (PU) 14, such as the 80486 or "Pentium" microprocessors manufactured by Intel Corporation of Santa Clara, Calif. The personal computer also includes system memory 15 (including read only memory (ROM) 16 and random access memory (RAM) 17), which is connected to the PU 14 by a system bus 18. The preferred computer 10 utilizes a BIOS 19 (Basic Input/Output System), which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively. Additionally, the present invention is not limited to computers that utilize ROM or RAM for system memory. Other technologies such as electronically programmable ROM (EPROM), ultraviolet light erasable and electronically programmable ROM (UVEPROM), electronically erasable and programmable ROM (EEPROM), FLASH and bubble memory may also be used.

Within the personal computer 10, various devices may be connected to enhance the utility and performance of the personal computer. A local hard disk drive 20 may be connected to the system bus 18 via a hard disk drive interface 21. A floppy disk drive 22, which is used to read or write a floppy disk 23, may be connected to the system bus 18 via a floppy disk drive interface 24. A CD-ROM drive 25, which is used to read a CD-ROM disk 26, may be connected to the system bus 18 via a CD-ROM interface 27. A user enters commands and information into the personal computer 10 by using input devices such as a keyboard 28, and/or pointing devices such as a mouse 29. Typically, these input devices are connected to the system bus 18 via a serial port interface 30 or a parallel port interface (not shown in FIG. 1). Other types of pointing devices (not shown in FIG. 1) include track pads, track balls, pens, head trackers, data gloves and other devices suitable for positioning a cursor on a computer monitor 31. A monitor 31 or other kind of display device may be connected to the system bus 18 via a video adapter 32.

The personal computer may be connected to a network of other computers or devices. A remote computer 11 in a networked environment is connected to a remote memory storage device 33. This remote memory storage device 33 is typically a large capacity device such as a hard disk drive, CD-ROM drive, magneto-optical drive or the like. The personal computer 10 may be connected to the remote computer 11 by a network interface 34, which is used to communicate over the local area network 12.

The personal computer 10 may also be connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to a remote computer 11 via either the local area network 12 and the wide area network 13 is not required, but merely illustrates methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37a–N, and data are provided to the personal computer 10 via computer-readable media. In the preferred computer, the computer-readable media include the local or remote memory storage devices, which may include the local hard disk drive 20, floppy disk 23, CD-ROM 26, RAM 17, ROM 16, and the remote memory storage device 33. In the preferred personal computer 10, the local hard disk drive 20 is used to store data and programs, including the operating system and programs.

The Operating System

FIG. 2 is a simplified block diagram illustrating the interaction between the computer hardware 50, the preferred operating system 36, and an application program 37a. Referring now to both FIGS. 1 and 2, when the personal computer 10 is turned on or reset, the PU 14 is forced to begin program execution at a specific memory location in the ROM 16. This specific memory location corresponds to the beginning of the bootstrap routine contained in the BIOS 19. The bootstrap routine functions to load the operating system 36 from the hard disk drive 20 into the RAM 17. Once the operating system 36 is loaded into RAM 17, the PU 14 executes the operating system 36 and causes the visual elements associated with the user interface of the operating system 36 to be displayed on the monitor 31.

The operating system 36, in conjunction with the BIOS 19 and associated device drivers, provides the basic interface between the computer's resources, the user, and the application program 37a. The operating system 36 interprets and carries out instructions issued by the user and/or application program(s). For example, when the user wants to load an application program 37a, the operating system 36 interprets the instruction (e.g., double clicking on the application program's icon) and causes the PU 14 to load the program code into RAM 17 from either the local hard disk drive 20, floppy disk 23, CD-ROM 26, or the remote memory storage device 33. Once the application program 37a is loaded into the RAM 17, it is executed by the PU 14. For larger programs, the operating system 36 causes the PU 14 to load various portions of program, or program modules, into RAM 17 as needed. In addition, several applications programs (37a–N) can be loaded into RAM at the same time. In this scenario, the operating system 36 will switch the PU 14 execution time between applications based on user requests, application program request, or by a time-sliced allotment of the processing time of PU 14.

The operating system 36 provides a variety of functions or services that allow an application program 37a to easily deal with various types of input/output (I/O). This allows the application program 37a to issue relatively simple function calls that cause the operating system 36 to perform the steps required to accomplish various tasks, such as displaying text on the monitor 31 (FIG. 1) or printing text on an attached printer (not shown). Generally described (with reference to FIG. 2), the application program 37a communicates with the operating system 36 by calling predefined functions provided by the operating system 36. The operating system 36 responds by providing the requested information in a message or by executing the requested task. In addition, the operating system may interface to the hardware components 50 in responding.

From this brief description, it should be appreciated that operating systems, such as "WINDOWS 95" and "WINDOWS NT", are quite complex and provide a wide variety of services that allow users and programs to utilize the resources available in the personal computer. Those skilled in the art will be familiar with operating systems and their various features, which include, but are in no means limited to, the specific messages and functions described above. For more comprehensive information regarding the "WINDOWS 95" and "WINDOWS NT" operating system and its interaction with programs, the reader may refer to any of a variety of publications, including the "Win32 Programmer's Reference" and "Advanced Windows" published by Microsoft Press.

The preferred embodiment of the present invention (herein after referred to as "AutoComplete") is implemented in "MICROSOFT EXCEL" for "WINDOWS 95", version 7.0. It should be understood that AutoComplete can readily be implemented in other applications running under other operating systems, such as Microsoft Corporation's "Windows 3.1", IBM Corporation's "OS/2", UNIX based operating systems and the operating system used in "MACINTOSH" computers manufactured by Apple Computer, Inc.

FIGS. 3a–j illustrate typical display screens for a spreadsheet program as would be observable on display 31 shown in FIG. 1. The spreadsheet consists of a group of columns labeled B–F and group of rows labeled 4–19. In a spreadsheet application such as "MICROSOFT EXCEL", a user can define and enter various types or categories of data. In the example shown in FIG. 3a, a list of the recent World Series from 1982 to the present has been entered. Column B contains the year that the World Series was played. Column C and column F contain the name of the American League and National League teams that opposed each other in the corresponding World Series. Finally, columns D and E illustrates the number of games that each team won during the World Series with the game score of the victor being circled.

Each entry in a spreadsheet is located in a cell. A cell is defined as the region in a spreadsheet where a single column and a single row intersect. For example, column F and row 9 intersect at cell 114 in FIG. 3a and contains the data entry "Braves". The user can move a cursor within a spreadsheet from one cell to another by entering cursor movement keys on the keyboard, by using a mouse or by using some other pointing device. The cell in which the cursor is present is referred to as the "active cell" and may be shown on the display in reverse video or as having a distinguishing border.

Figure 3B:
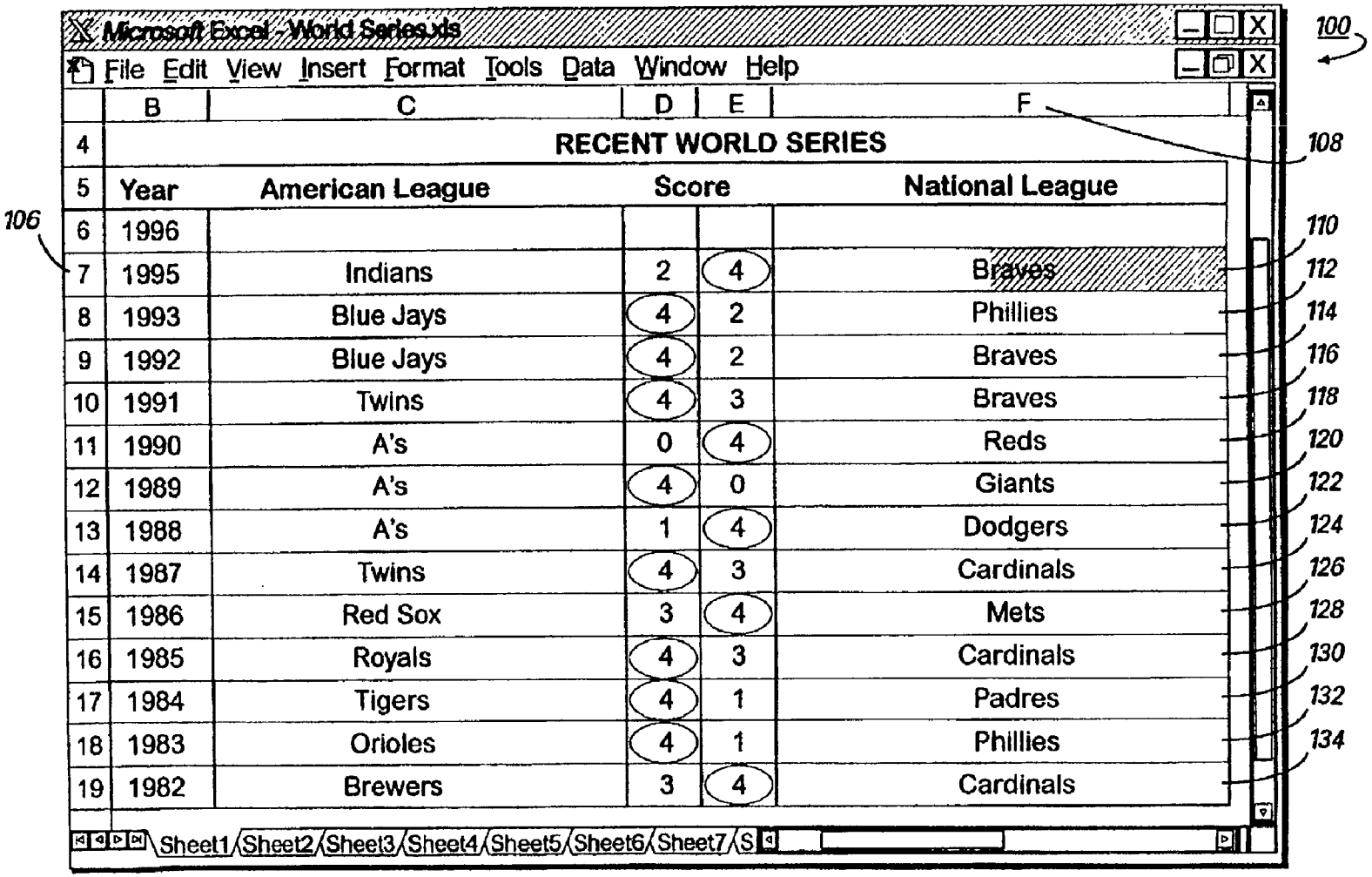
Figure 3C:
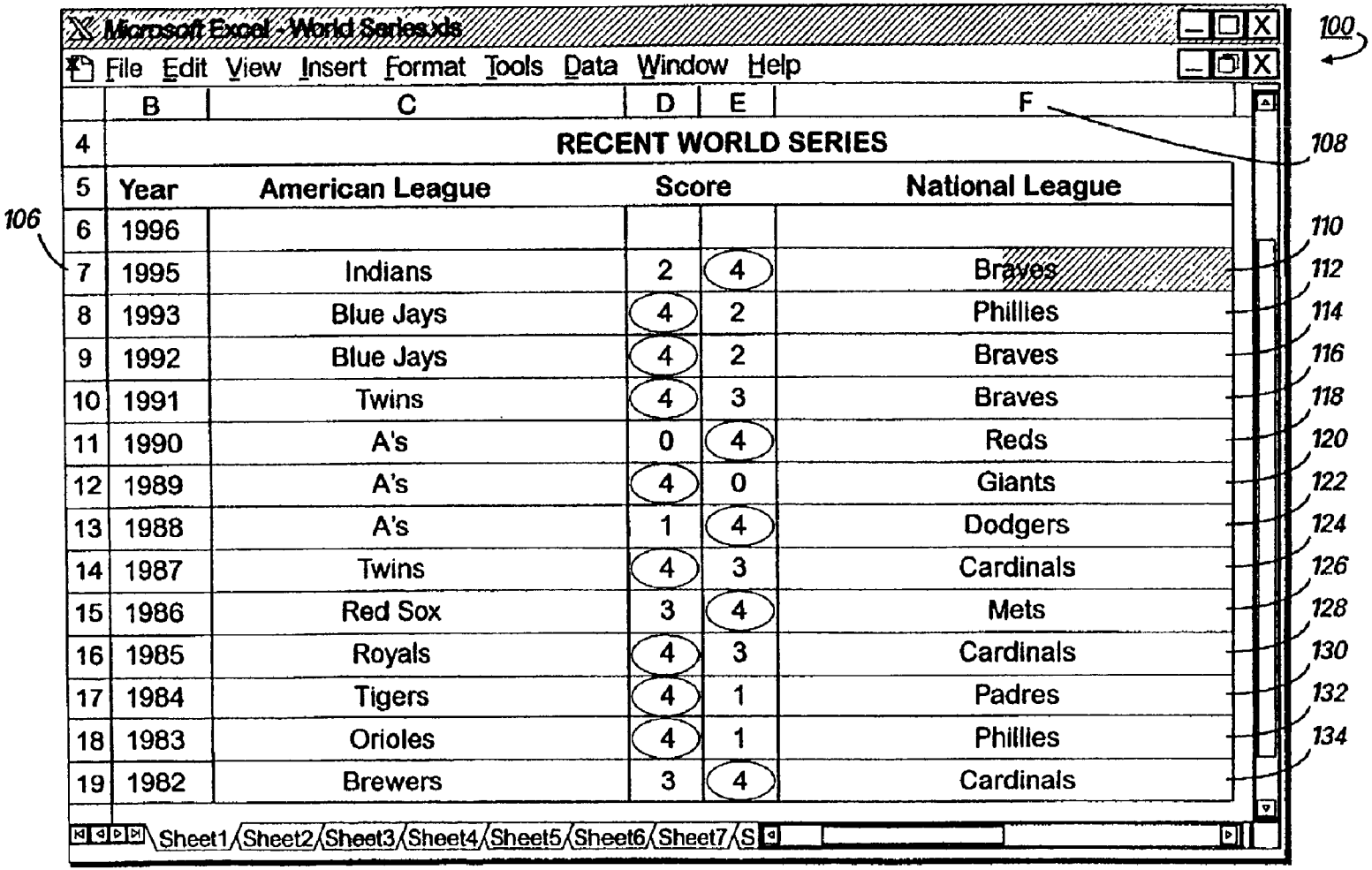
Figure 3D:
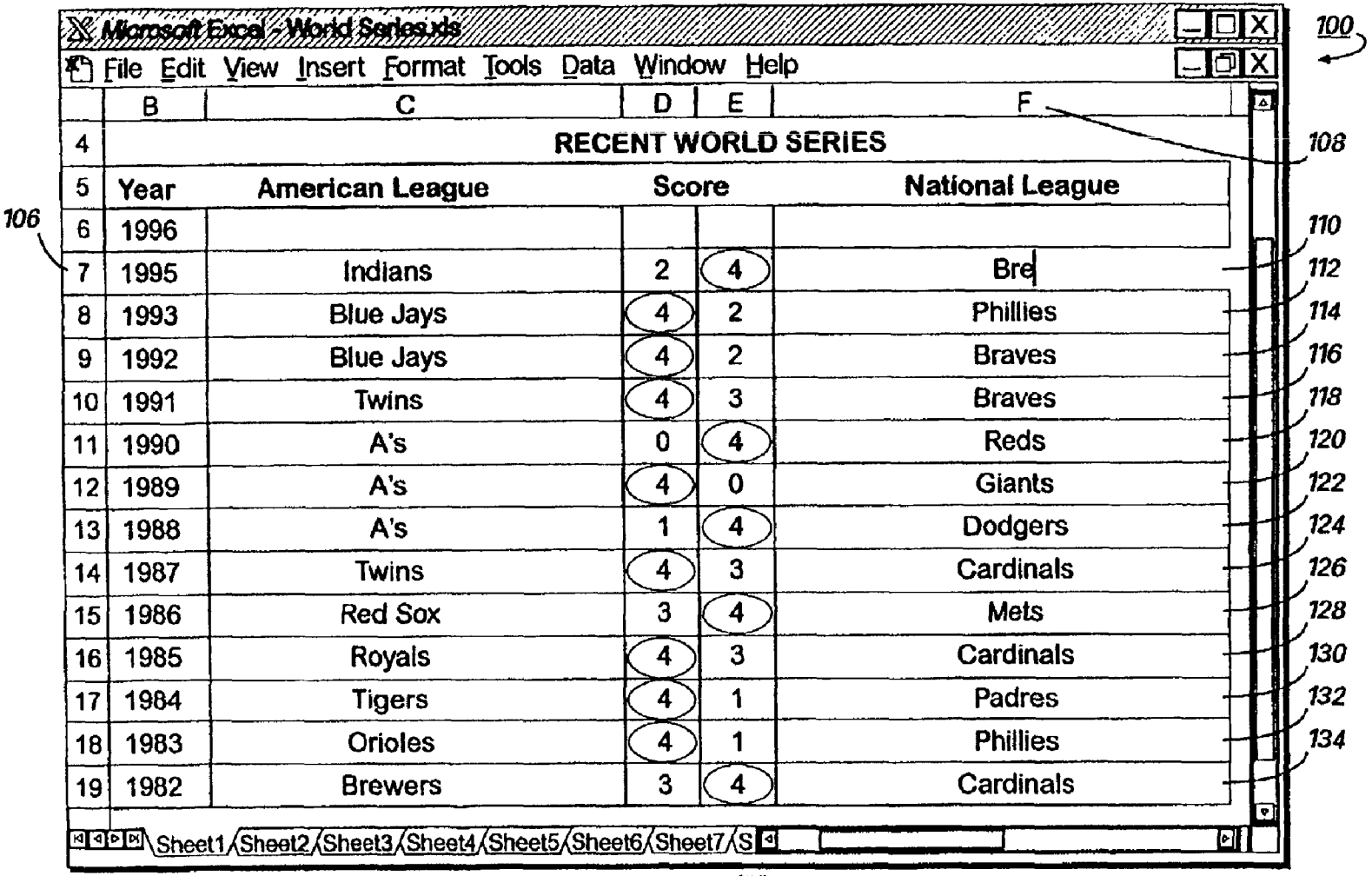
Figure 3E:
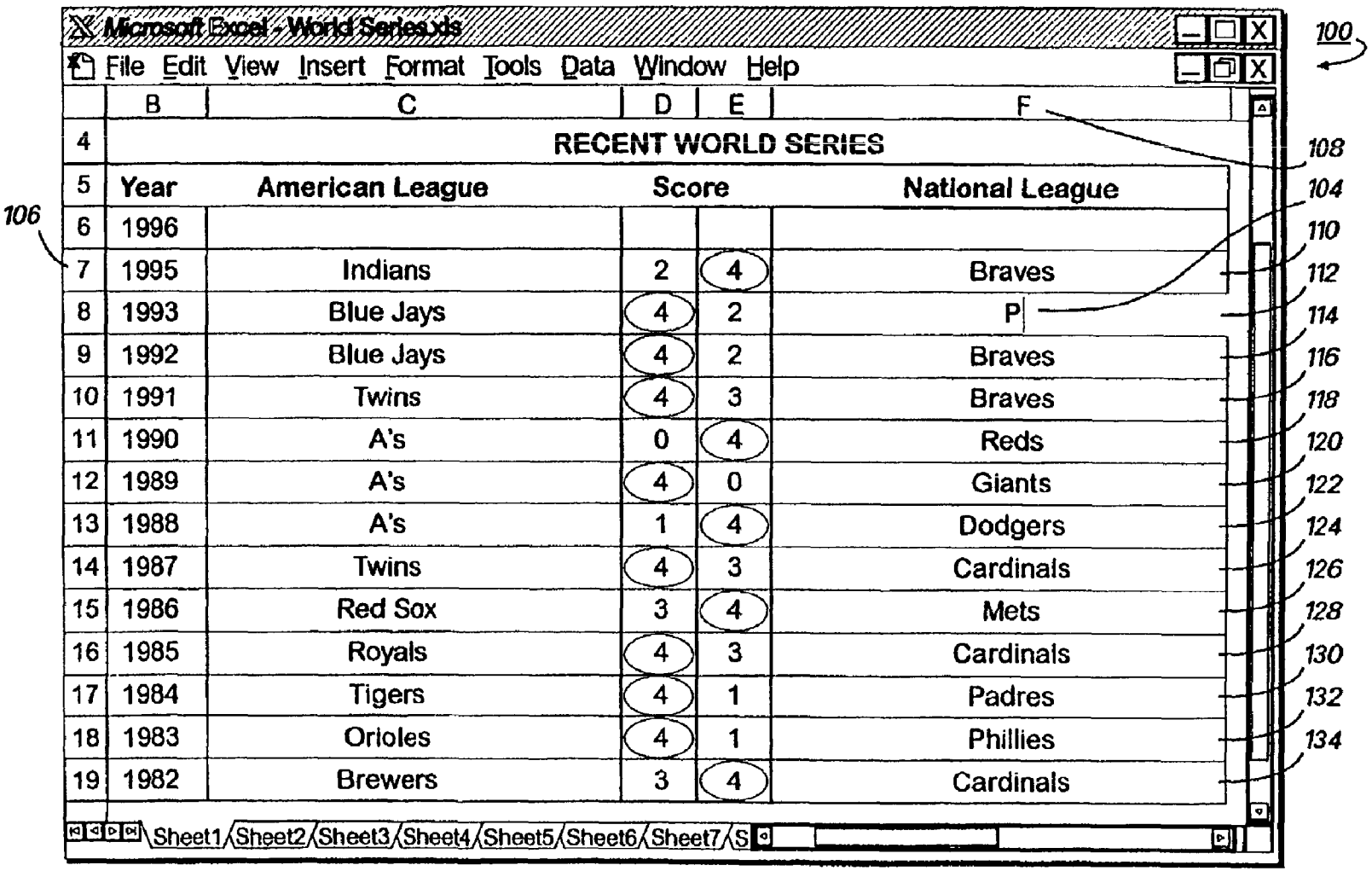
Figure 3G:
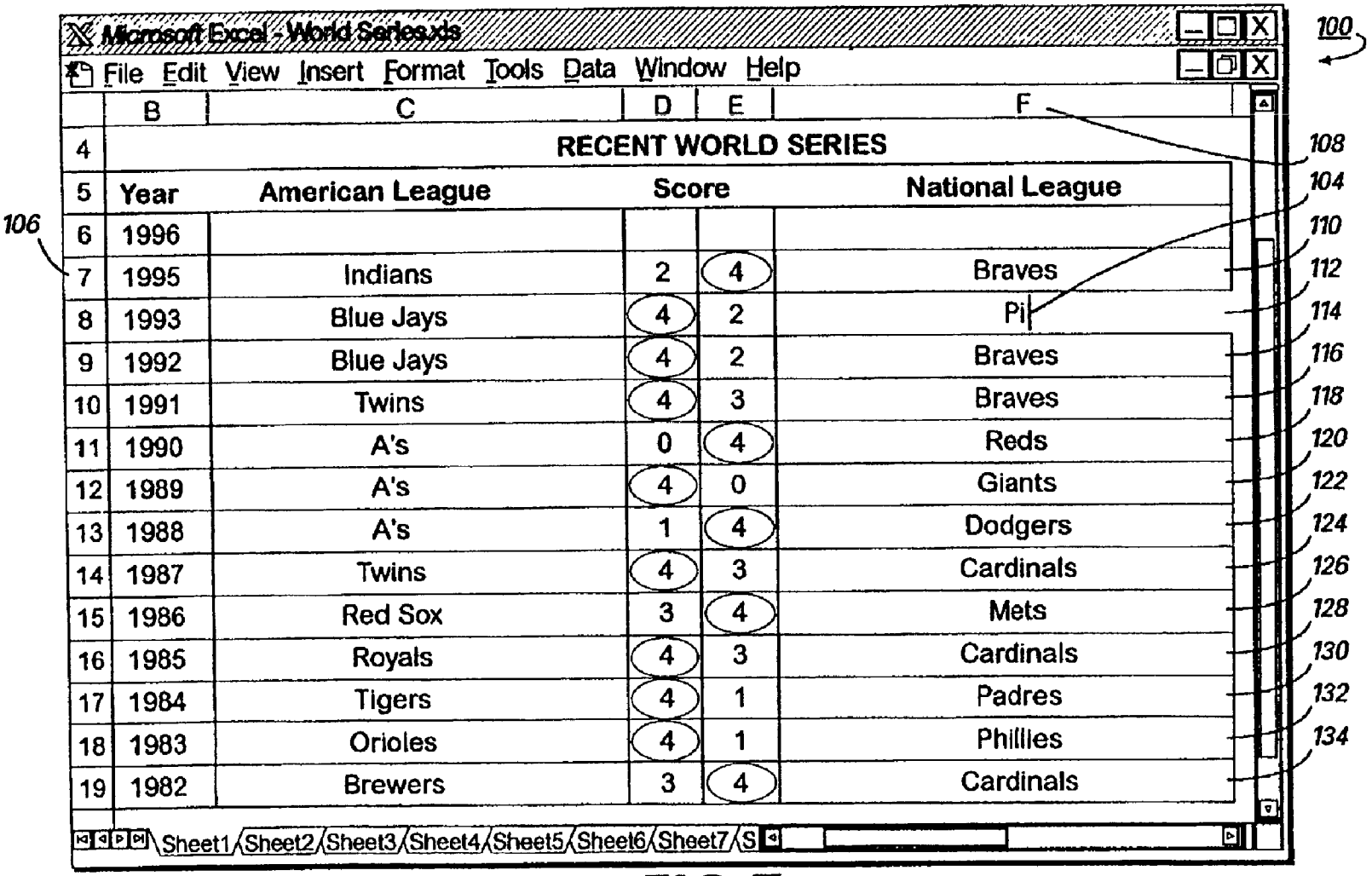
Figure 3H:
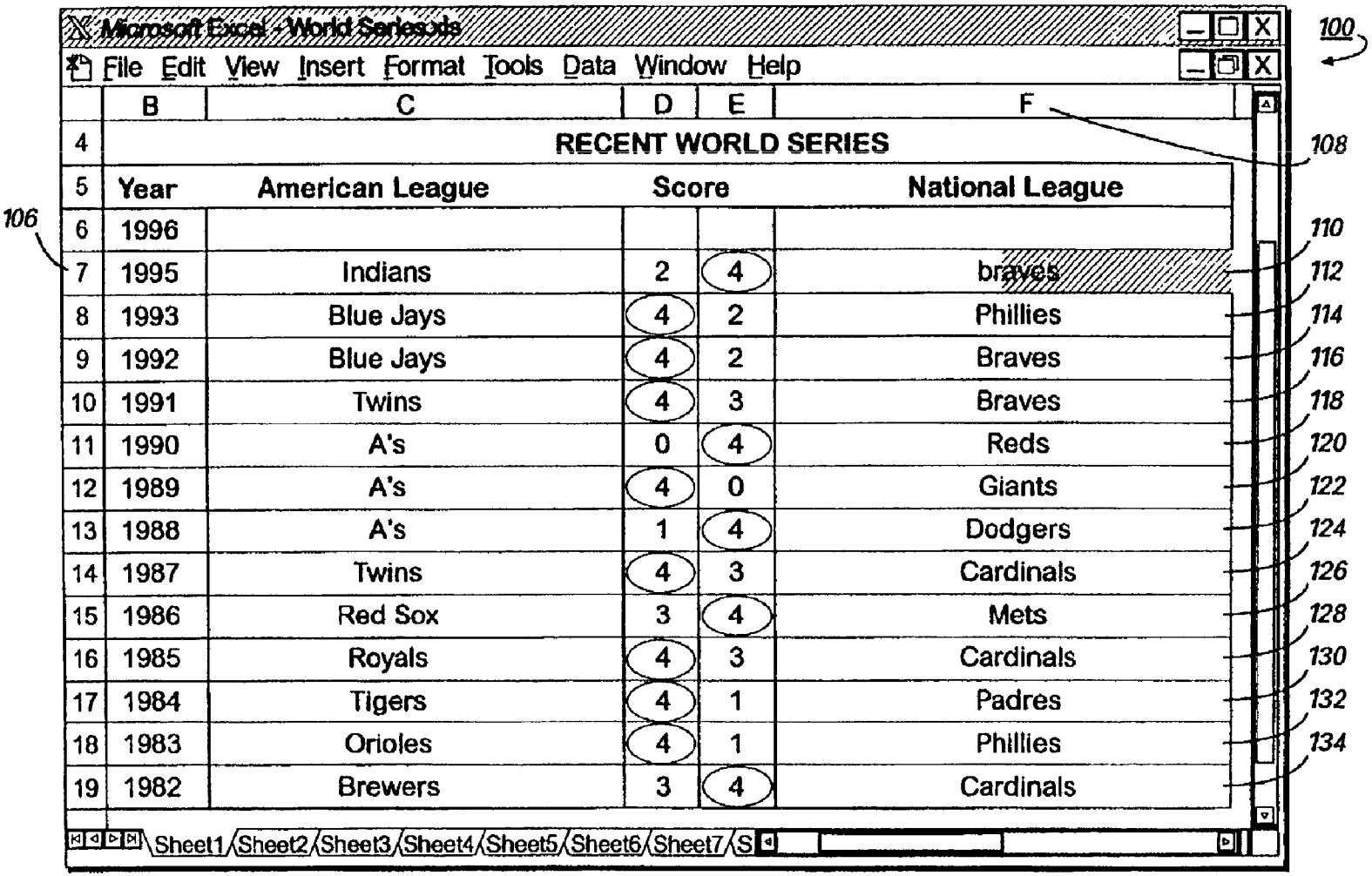
Figure 3I:
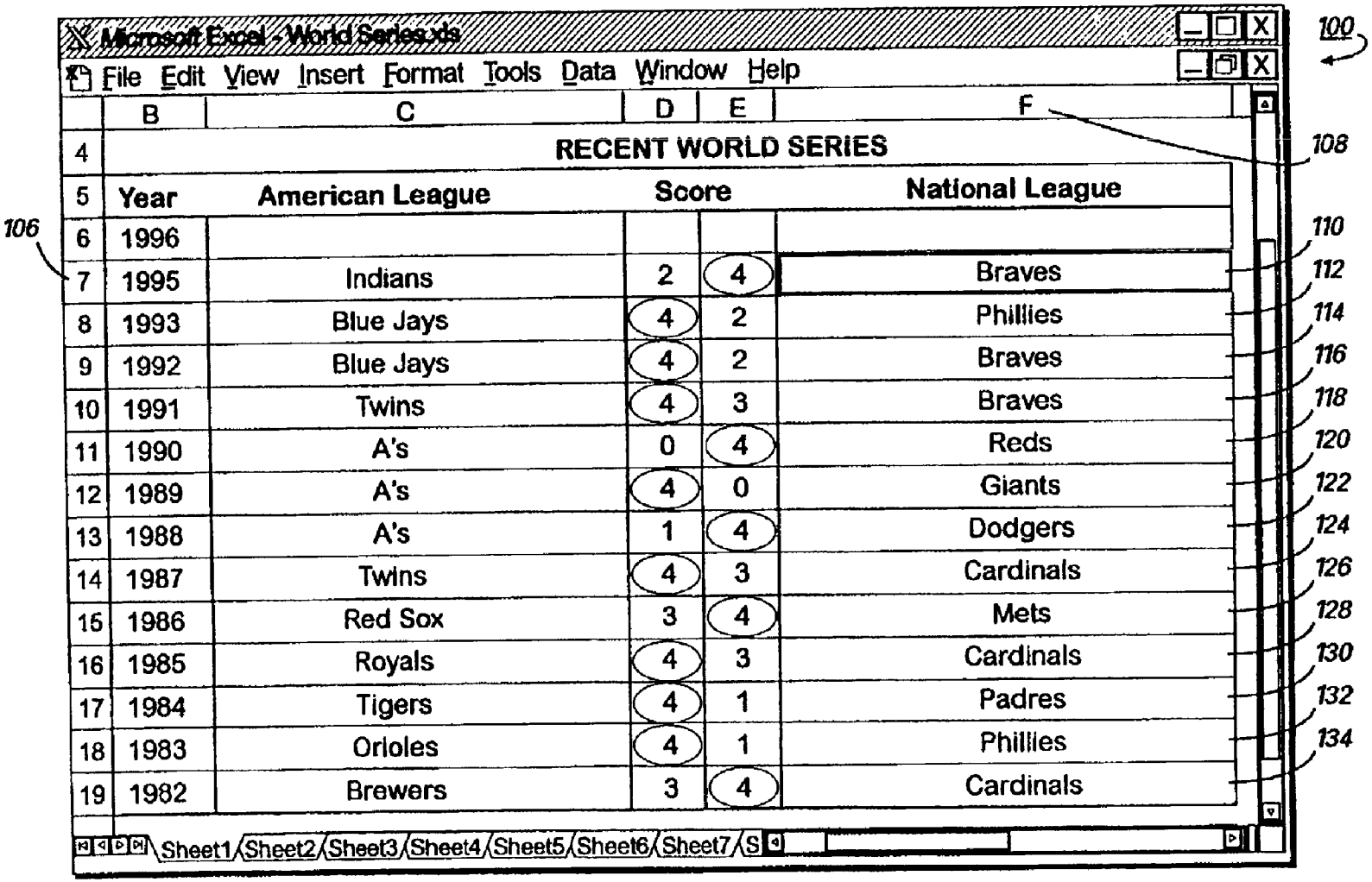
Figure 3J:
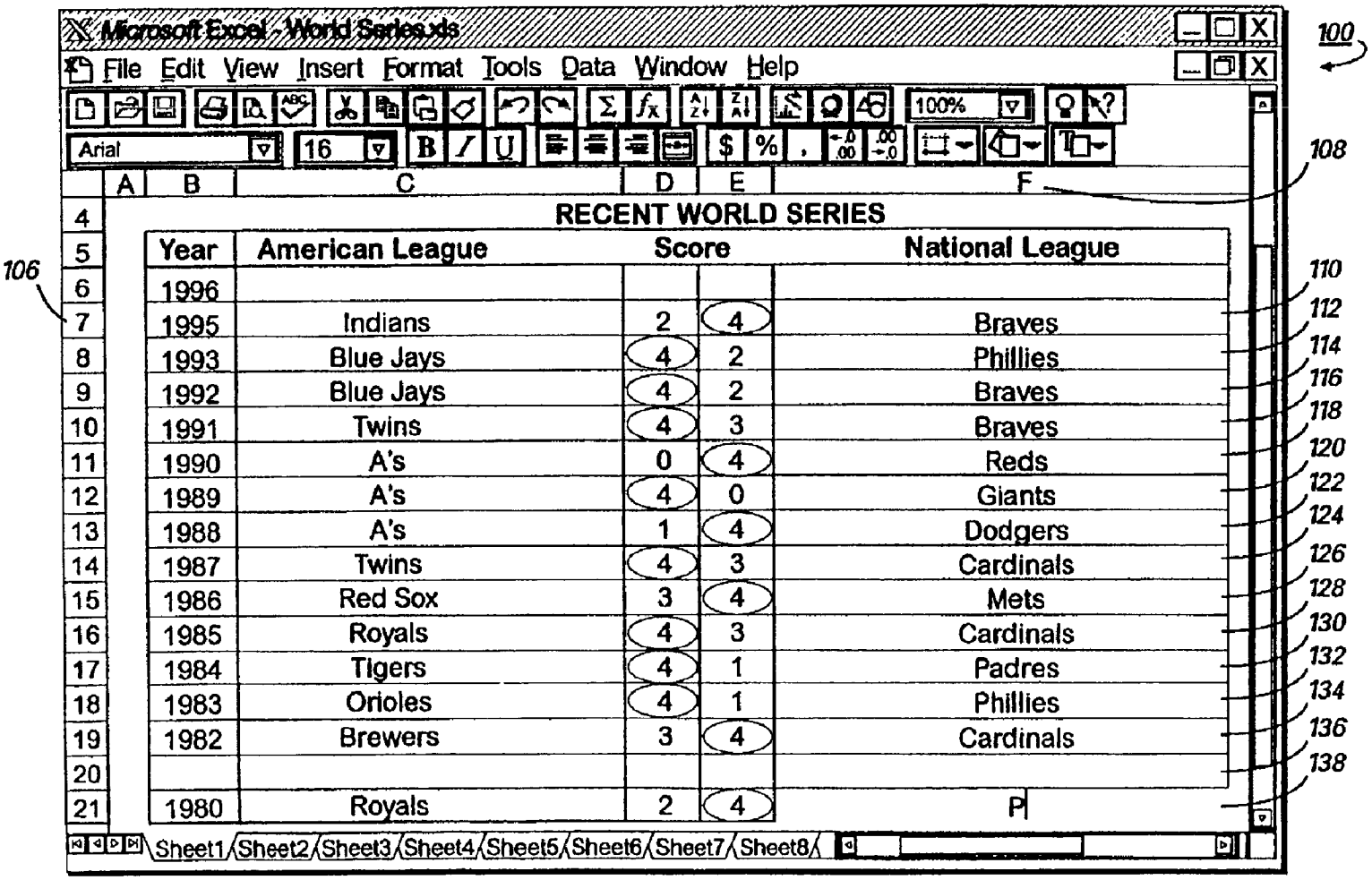
Figure 4:
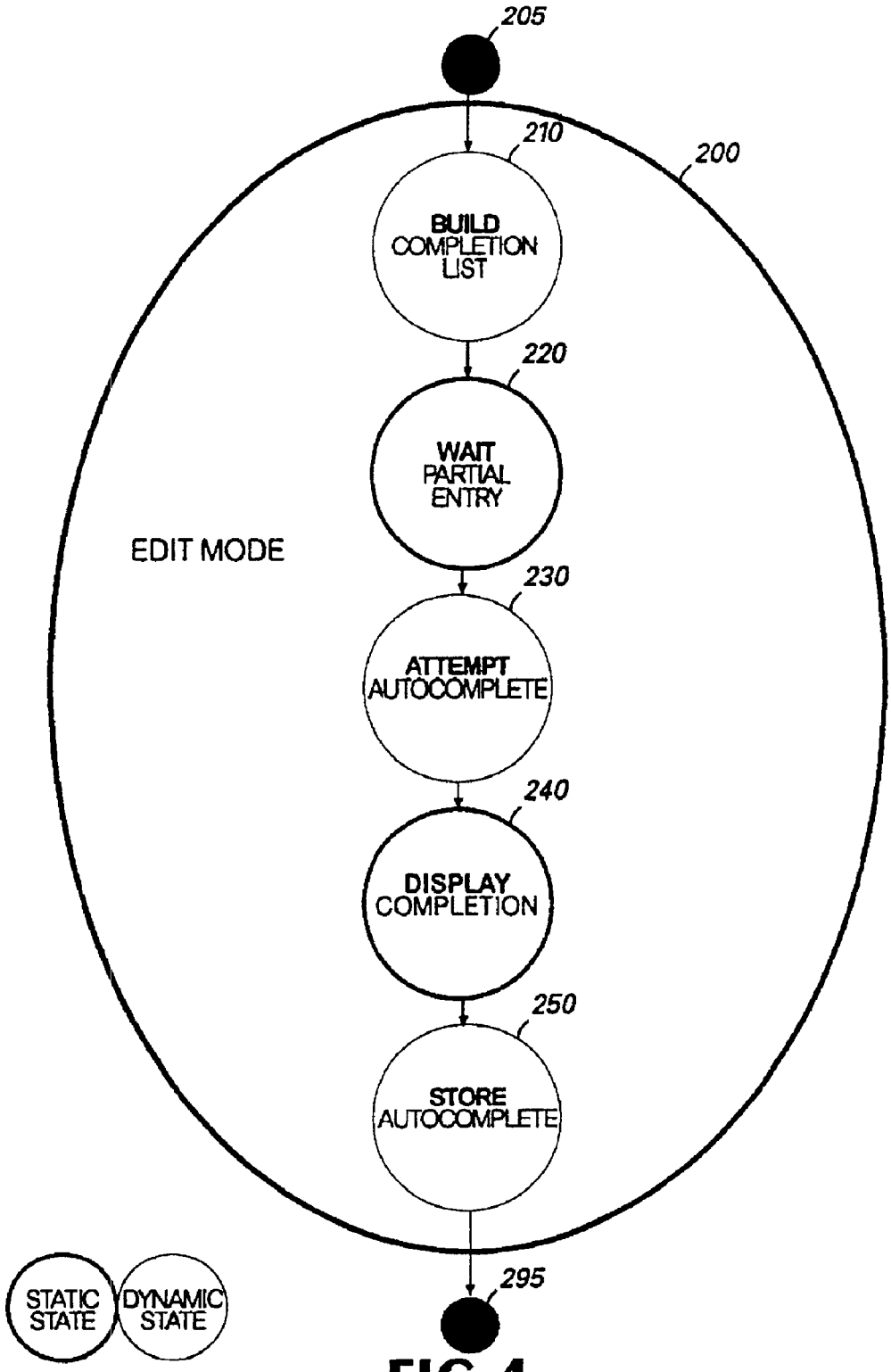
FIG. 4 is a state flow diagram depicting the actions taken by an embodiment of the present invention for entering a partial data entry and accepting a suggested completion.
Figure 5:
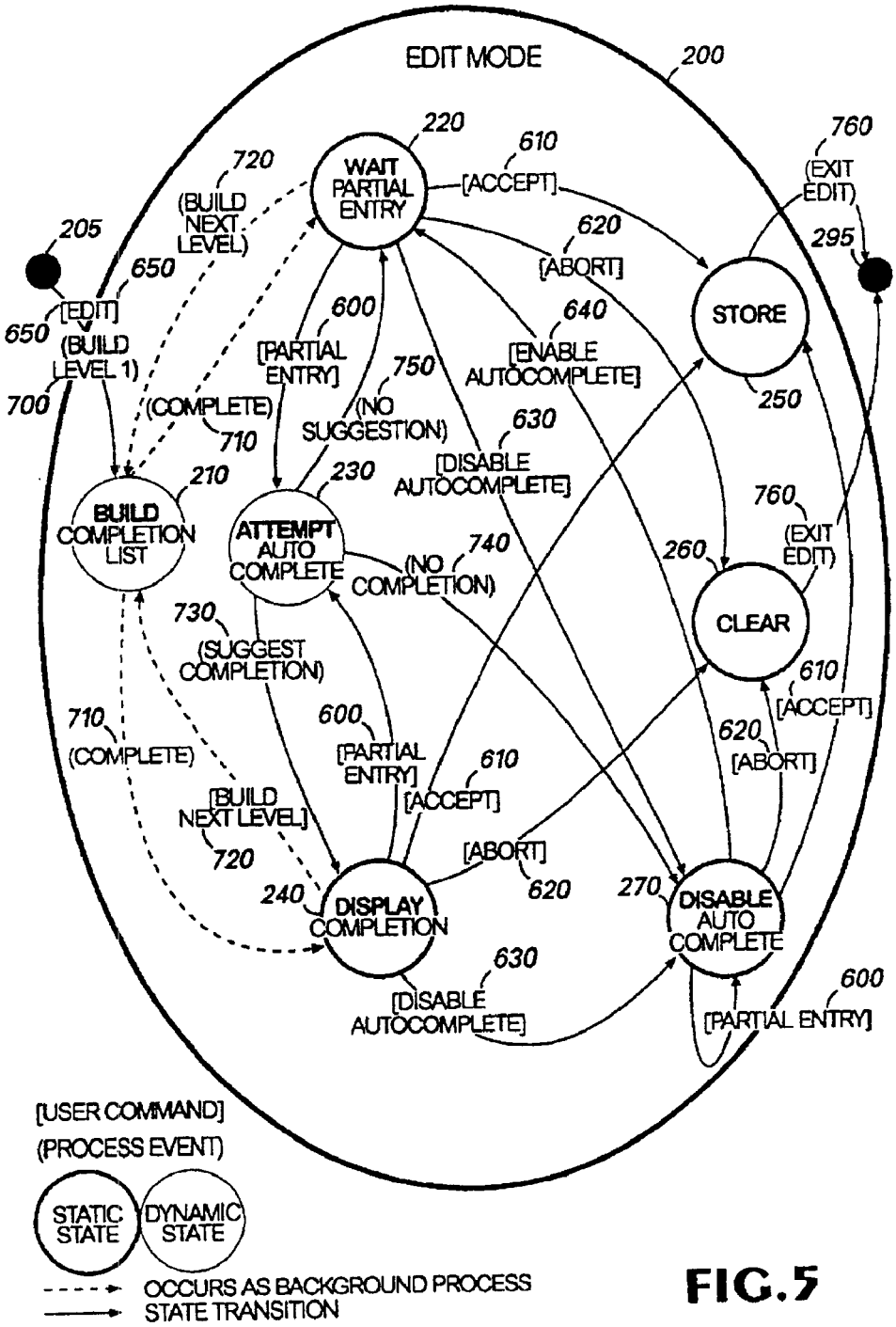
FIG. 5 is a state diagram illustrating a state machine with transitions between states being induced by user and process events in accordance with the preferred embodiment of the present invention.

A brief description of AutoComplete as embodied within "MICROSOFT EXCEL" or "WINDOWS 95" is provided in conjunction with the display screens in FIGS. 3a–j and the state flow diagram in FIG. 4. FIGS. 3a–j will be used to show the interaction between user input, the operation of AutoComplete, and the data that is displayed to the user in various operating states. FIG. 4 will be used to illustrate the simple state flow for the process of entering edit mode for an active cell, entering a partial data item, receiving a suggested completion, and accepting the suggested completion. FIG. 5, which provides a full state diagram of the AutoComplete process, will be used to describe the AutoComplete process in detail as consisting of a state machine with user commands and process events inducing transitions between states. Finally FIGS. 6–9 will be used to describe additional detail for several aspects of the AutoComplete process.

AutoComplete User Interface

The AutoComplete user interface in the preferred embodiment comprises eight functional areas: (1) Entering edit mode for an active cell; (2) Entering a partial data entry and finding a unique match; (3) Accepting a suggested completion; (4) Entering a partial data item over a suggested completion; (5) Entering a partial data entry and finding multiple matches; (6) Entering a partial data entry that disables further searches; (7) Obtaining a case conversion for a partial data entry; and (8) Entering a partial data entry where there are no associated cells. Each of these functional areas will be described with references being made to the user screens in FIGS. 3a–j and the state flow diagram in FIG. 4.

Entering edit mode for an active cell. Referring to FIGS. 3a and 4, the edit mode 200 for an active cell may be entered at point 205 by pressing a function key. The cursor 104, located in the middle of cell 110, illustrates that cell 110 is currently active with the edit mode being enabled. Upon entering edit mode, a list of completed data items is generated in the BUILD Completion List state 210. The list of completed data items is generated from completed data items stored within cells associated with active cell 110 (cells 112–134 for the illustrated example). The completed data items are previously entered data items which contain one or more characters or symbols. As will be described in more detail herein below, the list of completed data items will only contain one entry for each unique data item retrieved from the associated cells. It should be noted that the user may also enter the edit mode automatically by initiating a data entry in the active cell. After generating the completed data item list, the screen of FIG. 3a is displayed and the WAIT Partial Entry state 220 is entered.

Entering a partial data entry and finding a unique match. In the edit mode, entering a partial data entry will cause a transition to the ATTEMPT AutoComplete state 230 and invoke a search of the list of completed data items to find a completed entry that uniquely matches the partial data entry. FIG. 3b, illustrates the results of this process where partial data entry "B" has been entered. Cells 114 and 116 both contain the entry "Braves", which uniquely matches the partial data entry that has been entered in active cell 110. The DISPLAY Completion state 240 is then entered and the suggested completion is displayed in active cell 110. As can be seen in FIG. 3b, a suggested completion can be presented to the user by displaying the portion of the suggested completion that contains the partial data entry in normal video and the remainder of the suggested completion in reverse video.

Accepting a suggested completion. At this point the user can either accept the suggested completion, exit the edit mode, or enter an additional partial completion. The scenario in which the user accepts the suggested completion is illustrated in FIG. 4 by entering the STORE AutoComplete state 250. If the user accepts the suggested completion by pressing the enter key, the edit mode 200 is exited at point 295 (shown in FIG. 4), and the suggested completion is stored in cell 110 as illustrated in FIG. 3i.

Entering a partial data item over a suggested completion. Instead of accepting the suggested completion displayed in FIG. 3b, the user may modify the partial data item by entering an additional character (i.e., "r") into the active cell 110. This action will result in another search of the list of completed data items for a completed entry uniquely matching the modified partial data entry "Br". Again, the completed data item "Braves" will be displayed as a suggested completion in cell 110 as shown in FIG. 3c. If the user elects to again modify the partial data item by entering the additional character "e", then the list of completed data items will be searched to identify a suggested completion for the twice modified partial data entry "Bre". Since there are no completed data items that match the partial data entry "Bre", only the partial data item is displayed in the active cell 110 as shown in FIG. 3d.

Entering a partial data entry and finding multiple matches. Referring to FIG. 3e, the results of entering a partial data entry that has multiple matching items in the completed data item list is illustrated. In this example, the partial data entry "P" has been entered into active cell 112. Upon searching the list of completed data items, it can be seen that the completed data items "Padres" from cell 130 and "Phillies" from cell 132 both match the partial entry "P" in active cell 112. In the preferred embodiment, a suggested completion will not be displayed under these circumstances; however, in alternate embodiments, a decision process could be implemented to choose and display one of the possible completions. If the user subsequently enters the letter "h", then the modified partial data entry of "Ph" will uniquely match the completed data item "Phillies" and the suggested completion will be displayed as shown in FIG. 3f.

Entering a partial data entry that disables further searches. Under the conditions illustrated in FIG. 3f, if the user enters the letter "i", the modified partial data entry of "Pi" will not have a matching completed data item in the completed data item list. Similar to the example shown in FIG. 3d for the partial data entry "Bre", the partial data entry "Pi" will be displayed in the active cell 112 as shown in FIG. 3g. The difference between the example in FIG. 3d and the example in FIG. 3g is that in the former, a non-matching partial data entry was entered over a suggested completion and in the latter, a non-matching partial data entry was entered when the previous partial data entry had multiple matches. Both of these examples are provided to illustrate that in either case, the result is the same. When a partial data item is entered and there are no matching completed data items in the completed data item list, then the partial data entry is displayed in the active cell. In addition, if the user enters additional characters in the active cell, the list of completed data items will not be searched. The reason for disabling further searches is that if the completed data item list does not contain a match for a partial data entry (i.e., "Pi"), then it will not contain a match for any partial data entry beginning with the previous partial data entry (i.e., "Pit"). This aspect of AutoComplete will be described in more detail herein below with respect to FIGS. 3h–i.

Obtaining a case conversion for a partial data entry. Now turning to FIGS. 3h–i, the process of the case conversion in the AutoComplete process is illustrated. In FIG. 3h, the partial data entry "br" has been entered into active cell 110 and a suggested completion has been found and displayed. The portion of the suggested completion that matches the partial data entry is displayed in normal video in conformance with the capitalization of the partial data entry "br". The remainder of the suggested completion "aves" is displayed in reverse video. The actual completed data item "Braves" matching the partial data entry "br" begins with an upper case "B". If the user accepts the suggested completion by pressing the enter key, the capitalization in the active cell will be adjusted to correspond to the capitalization of the completed data item and the display of FIG. 3i will result. Alternatively, the user can disable the case conversion by changing the insertion point in active cell 110 (i.e., moving the cursor within the active cell by either the keypad or the mouse). If the user disables the case conversion and then accepts the suggested completion, the completed data item "braves" will be entered into the spreadsheet and will also be included in subsequent lists of completed data items if left unaltered.

Entering partial data entry where there are no associated cells. FIG. 3j illustrates the definition of associated data items. As mentioned previously, the list of completed data items is formed from a set of cells associated with the active cell. As will be described in more detail below, AutoComplete as implemented in the preferred embodiment, defines associated cells as including the set of cells that: share the same column as the active cell; extend above and below the active cell; and are bordered by "white space". In FIG. 2j, cell 138 is shown as the active cell and the partial data entry "P" has been entered. Active cell 138 does not have any associated cells because cell 136, which is directly above active cell 138, is empty (contains "white space") and there are no data entries below active cell 138. When the edit mode is invoked for active cell 138, the list of completed data items generated will be empty and thus, in response to entering the partial data entry "P", no suggestions will be received. The suggested completions in cells 110–134 are not considered to be associated with active cell 138 because they are separated by from the active cell 138 by the white space in cell 136. Therefore, the preferred embodiment defines associated data items as those that are adjacent and share a common column. Other mechanisms, algorithms or decision rules can be used to define associated data items and the embodiment illustrated by this example should not limit the scope of AutoComplete. Those skilled in the art will appreciate that definitions such as: adjacent elements in a common row; elements that are within a range of N cells from the active cell; all data items in a column; all data items in a row; all data items in a spreadsheet; all data items formatted in a particular manner (i.e., bolded, underlined, italicized, etc.); and other similar methods can be used for determining which data items are associated. Essentially, any mechanism to differentiate between associated and non-associated cells can be utilized in this invention. As an example, in the preferred embodiment, the data in the cells can include formatting information of various types and combinations. The filtering algorithm can be designed to detect the formatting information and only select completed data items that contain specific formatting information (i.e., only bolded and italicized data will be selected).

AutoComplete as a State Machine

The detailed operation of AutoComplete can be described in the form of a state machine. In general, a state machine is a means to illustrate the operation of a process by identifying the various unique states in which the process can exist, and identifying what events or circumstances will cause the process to transition between those states.

Referring to FIG. 5, a diagram of the AutoComplete state machine is shown as consisting of two types of states: static, depicted as a solid circle; and dynamic, depicted as a broken circle. A static state is a steady state in which an external event must occur in order to transition to a different state. In the absence of an external event, a process can remain in a static state indefinitely. A dynamic state is a momentary or transitory state in which a process only exists while performing a specific function or task. Upon completion of the task, a transition to another state will occur. A dynamic state generally comprises the execution of an algorithm and is exited upon completion of that algorithm.

The AutoComplete process comprises 3 static states and 4 dynamic states.

These AutoComplete states include static states:

WAIT Partial Entry 220;

DISPLAY Completion 240;

DISABLE AutoComplete 270; and dynamic states:

BUILD Completion List 210;

ATTEMPT AutoComplete 230;

STORE 250; and

CLEAR 260.

Three types of transitions exist for the AutoComplete state machine and include: User commands; Process events; and Background events. The User commands, indicated by [xxxxx], occur in response to actions taken by the user. The Process events, indicated by (xxxxx), occur automatically upon the completion of processing in a dynamic state. The Background events, indicated by (xxxxx) and drawn with dashed lines, occur during the idle time between user commands.

The AutoComplete user commands include:

[Partial Entry] 600: Partial data item for a cell;

[Accept] 610: Accepts a suggested completion;

[Abort] 620: Rejects the data in the active cell;

[Disable AutoComplete] 630;

[Enable AutoComplete] 640; and

[Edit] 650: Enables the edit mode for a cell.

The AutoComplete process events include:

(Suggested Completion) 730;

(No Completion) 740;

(No Suggestion) 750; and (Exit Edit) 760.

The AutoComplete background process events include:

(Build Level 1) 700;

(Complete) 710; and (Build Next Level) 720.

Upon entering the edit mode for an active cell, the AutoComplete process will initiate the performance of two functions. The first function is the generation of the list of completed data items associated with the active cell. In the preferred embodiment, the completed data item list will be generated in a tiered approach as a background process. The tiered approach consists of building the list of completed data items one level at a time where each level includes a specific number of associated cells. The second function is to identify and provide a suggested completion for a partial data entry.

Entering the [Edit] user command 650 causes the edit mode 200 to be entered as shown at point 205. The (Build Level 1) process command 700 is issued automatically upon entering edit mode and the BUILD Completion List state 210 is entered. In the BUILD Completion List state 210, the first level of the completed data item list is generated. In the preferred embodiment, the first level includes the 50 cells that are most closely associated with the active cell. As will be described later, this includes the associated cells that are physically closest to the active cell. If there are a limited number of data entries (i.e., less than 50), the first level of the completion list will include all of the associated entries. After the first level of the completion list has been generated, a (Complete) process event 710 is executed and a transition to the WAIT Partial Entry state 220 occurs. In the WAIT Partial Entry state 220, the application program waits for the reception of a user command.

If there is idle time between entering user commands in the WAIT Partial Entry state 220, and the completion list has not been fully generated, a (Build Next Level) background process event 720 will be issued resulting in a transition to the BUILD Completion List dynamic state 210. (Note, this event may also be issued in the DISPLAY Completion state 240.) When the next level of the completion list has been generated, a (Complete) process event 710 will be issued and a transition to the WAIT Partial Entry state 220 will occur (or a transition to the previous state). The (Build Next Level) background process event 720 will continue to be issued until the list of completed data items has been fully generated.

In the WAIT Partial Entry state 220, four user commands are accepted: [Partial Entry], [Disable AutoComplete], [Abort], and [Accept]. The cell 110 in FIG. 3a and the cell 112 in FIG. 3e illustrate typical displays during the WAIT Partial Entry state 220. If the user provides [Partial Entry] 600, a transition to the ATTEMPT AutoComplete state 230 will occur. This transition will occur in response to entering the first character in the active cell. This is an improvement over similar implementations, which require the entry of several characters prior to attempting to automatically complete the entry.

In the ATTEMPT AutoComplete state 230, the partial data entry will then be used as a character mask to search through the list of completed data items for a unique match. A unique match exists if there is only one item in the completed data item list that begins with the same character or characters defining the partial data entry. A unique match is further defined as, given that an N character partial entry has been entered, if there is one and only one data item in the completed data item list that begins with these N characters, then that data item is a unique match. If more than one entry matches the first N characters, then a unique match does not exist.

The ATTEMPT AutoComplete state 230 can be entered prior to fully generating the list of completed data items. If this occurs, the search for a suggested completion will be limited to the completed data item list in its current state (i.e., the levels that have been generated). But, if updating the list of completed data items results in destroying the unique status of the partial data entry, the current AutoComplete suggestion remains intact until either the user accepts the data item or enters a subsequent partial entry.

As a result of entering the ATTEMPT AutoComplete state 230, one of three possible outcomes will be realized: (1) a unique match will be found; (2) no matches will be found; or (3) multiple matches will be found.

If a unique match is found, then a (Suggested Completion) process event 730 is issued, which results in a transition to the DISPLAY Completion state 240. Referring to FIG. 3b, a typical display for the DISPLAY Completion state 240 is illustrated. Here, [Partial Entry] 600 containing the partial data entry "B" was entered in the WAIT Partial Entry state 220 and this resulted in a transition to the ATTEMPT AutoComplete state 230. Upon finding the unique match "Braves", the (Suggested Completion) process event 730 issued, which resulted in a transition to the DISPLAY Completion state 240 for displaying the suggested completion in cell 110.

If no matches are found, the (No Completion) process event 740 is issued, which results in a transition to the DISABLE AutoComplete state 270. Examples of the scenario include FIG. 3d, where the partial data entry "Bre" in cell 110 has no matches, and FIG. 3g, where partial data entry "Pi" in cell 112 has no matches.

If multiple matches are found, the (No Suggestion) process event 750 is issued, which results in a transition back to the WAIT Partial Entry state 220. An example of this transition and the resulting display can be seen by referring to FIG. 3e where the partial data entry "P" in cell 104 matches both the completed data items "Padres" of cell 130 and "Phillies" of cell 132.

The [Partial Entry] command 600, entered in the WAIT Partial Entry state 220, can also consist of multiple characters. This occurs when entering additional characters to distinguish a partial data entry from multiple matches. As an example, the character "h" can be appended to partial data entry "P" in FIG. 3e to form partial data entry "Ph" and a resulting transition to the ATTEMPT AutoComplete state 230. The search of the completed data item list will result in finding the suggested completion "Phillies" and eliminating "Padres". A (Suggested Completion) process event 730 is then issued and a transition to the DISPLAY Completion state 240 occurs with the display of FIG. 3f being produced.

In contrast, if the character "i" is appended to the partial data entry "P" in FIG. 3e, partial data entry "Pi" will be formed and a transition to the ATTEMPT AutoComplete state 230 will occur. The search of the completed data item list will result in finding no matches for partial data entry "Pi". The (No Completion) process event 740 will be issued and a transition to the DISABLE AutoComplete state 270 will occur.

In the WAIT Partial Entry state 220, the [Disable AutoComplete] command 630 can also be entered. In the preferred embodiment, the [Disable AutoComplete] command 630 consists of moving the insertion point or cursor in the edit window. Other methods could also be utilized such as pressing a function key. Entering this command causes a transition to the DISABLE AutoComplete state 270.

The final two commands that can be entered in the WAIT Partial Entry state 220 are [Abort] 620 and [Accept] 610. Entering the [Abort] 620 command results in a transition to the CLEAR AutoComplete state 260, in which the pre-edited contents of the active cell will be restored. The (Exit Edit) process event 760 will then be issued and the edit mode 200 will be exited at point 295. Any partial data entries displayed prior to the [Abort] 620 command will be erased. Entering the [Accept] command 610 causes a transition to the STORE AutoComplete state 250 in which state the contents displayed in the active cell are stored and the (Exit Edit) process event is issued to exit the edit mode 200 at point 295. In the preferred embodiment, an [Accept] 610 can be issued by entering a carriage return or by using the key pad or mouse to change active cells. An [Abort] 620 can be issued by entering the [ESC] key. Other methods could also be used to implement these commands and are contemplated by the present invention.

The DISPLAY completion state 240, operates to display a suggested completion in the active cell. If the completion list is not fully generated, the (Build Next Level) background event 720 may be issued as described above. While in the DISPLAY completion state 240, the user can enter the [Partial Entry] 600, [Accept] 610, [Abort] 620 or [Disable AutoComplete] 630 commands.

Entering [Partial Entry] 600 in the DISPLAY Completion state 240 causes a transition to the ATTEMPT AutoComplete state 230. The completed data item list will then be examined for a unique match of the partial entry. As a result of entering the ATTEMPT AutoComplete state 230 from the DISPLAY Completion state 240, two possible outcomes can be realized: (1) a unique match will be found or (2) no matches will be found. Two examples illustrate these results. First, appending an "r" to the partial data entry "B" in FIG. 3b causes a transition to ATTEMPT AutoComplete state 230 and issuing of (Suggested Completion) 730 for the suggested completion "Braves" as shown in FIG. 3c. Second, appending an "e" to the partial data entry "Br" in FIG. 3c causes a transition to ATTEMPT AutoComplete state 230 and issuing of (No Completion) process event 740. The resulting state for this example is DISABLE AutoComplete 270 and is illustrated in FIG. 3d.

Entering [Accept] 610 in the DISPLAY Completion state 240 causes a transition to the STORE AutoComplete state 250. Entering this state from the DISPLAY Completion state 240 will invoke a case conversion if one is required. Entering [Abort] 610 in the DISPLAY Completion state 240 will have the same response as entering it in the WAIT Partial Entry state 220 discussed above.

Entering the [Disable AutoComplete] command 630 in the DISPLAY completion state 240 will cause a transition to DISABLE AutoComplete state 270. The contents of the active cell will be maintained; however, the portion of the data entry that had been displayed in reverse video will be changed to normal video to indicate that AutoComplete is disabled.

The DISABLE AutoComplete state 270 operates to eliminate the overhead of searching through the completed data item list when it is known that a match will not be found. For example, in FIG. 3e there are no matching entries in the completed data item list for partial data entry "Pi". Appending additional characters to the partial data entry "Pi" will not change this situation. Thus, the DISABLE AutoComplete state 270 will allow the user to continue entering partial entries without burdening the PU 14 (shown in FIG. 1) with fruitless searches.

The DISABLE AutoComplete state 270 may also be entered if the completed data item list is empty. This situation will occur when the first data item in a new area is being entered or all other data items have been filtered out. In an embodiment which filters out numeric data items, editing a cell within a column of numbers will result in issuance of a (No Completion) 740 process event in the ATTEMPT AutoComplete state 230 and a subsequent transition to the DISABLE AutoComplete state 270.

In the DISABLE AutoComplete state 270, an [Abort] 620, [Accept] 610, or [Enable AutoComplete] 640 commands can be entered. The responses to the [Abort] 620 and [Accept] 610 commands are identical to the responses generated in the DISPLAY Completion state 240. Entering an [Enable AutoComplete] 640 command will cause a transition to the WAIT Partial Entry state 220. In the preferred embodiment, the [Enable AutoComplete] 640 command can take the form of back-spacing over or deleting the last entered character(s) that caused the (No Completion) 240 process event to be issued, or returning the insertion point to the end of the partial data entry. As an example, FIG. 3g shows the display of partial entry "Pi" when the DISABLE AutoComplete state 270 is active. Backspacing over the letter "i" will cause the issuance of the [Enable AutoComplete] 640 command and a transition to the WAIT Partial Entry state 220; however, the ATTEMPT AutoComplete state will not be entered until a new partial data item is entered.

The CLEAR AutoComplete state 260 can be entered from the WAIT Partial Entry state, the DISPLAY Completion state 240, or the DISABLE AutoComplete state 270 upon the execution of the [Abort] 620 command. The [Abort] 620 command operates to erase the data that is currently being displayed in the active cell and then exiting the edit mode 200. In addition, the contents of the active cell prior to entering the edit mode 200 will be restored.

In the STORE AutoComplete state 250, the data being displayed in the active cell is stored and the (Exit Edit) process event 760 is executed to exit the edit mode 200 at point 295. This process occurs independent of the prior state; however, when entering from the DISPLAY AutoComplete state 240, a case conversion may be performed on the suggested completion.

Case Conversion

The case conversion algorithm is a unique aspect of the AutoComplete process and gives it the ability to handle data items with mixed upper and lower case characters. In general, the AutoComplete algorithm is case insensitive during the data entry process. But, when a suggested completion has been accepted, the AutoComplete process will adjust the capitalization of the data item to be consistent with matching entries. The purpose behind the case conversion is to provide consistency for the data items in the spreadsheet. If a data item is being entered in lower case, and a matching completed data item is found that is in upper case, then the matching item will be displayed as a suggested completion. The portion of the suggested completion that matches the partial data item (ignoring the capitalization) will be shown in normal video and in the capitalization that the partial data item was entered. The portion of the suggested completion that does not include the partial data item will be displayed in reverse video and in the capitalization that corresponds with the suggested completion. Accepting the suggested completion will result in adjusting the case of the partial entry to be the same as that of the suggested completion. But, if the user changes the insertion point or in some other way executes a DISABLE AutoComplete command 630, then accepting the data in the active cell will result in maintaining the case of the characters as displayed in the active cell.

Figure 6:
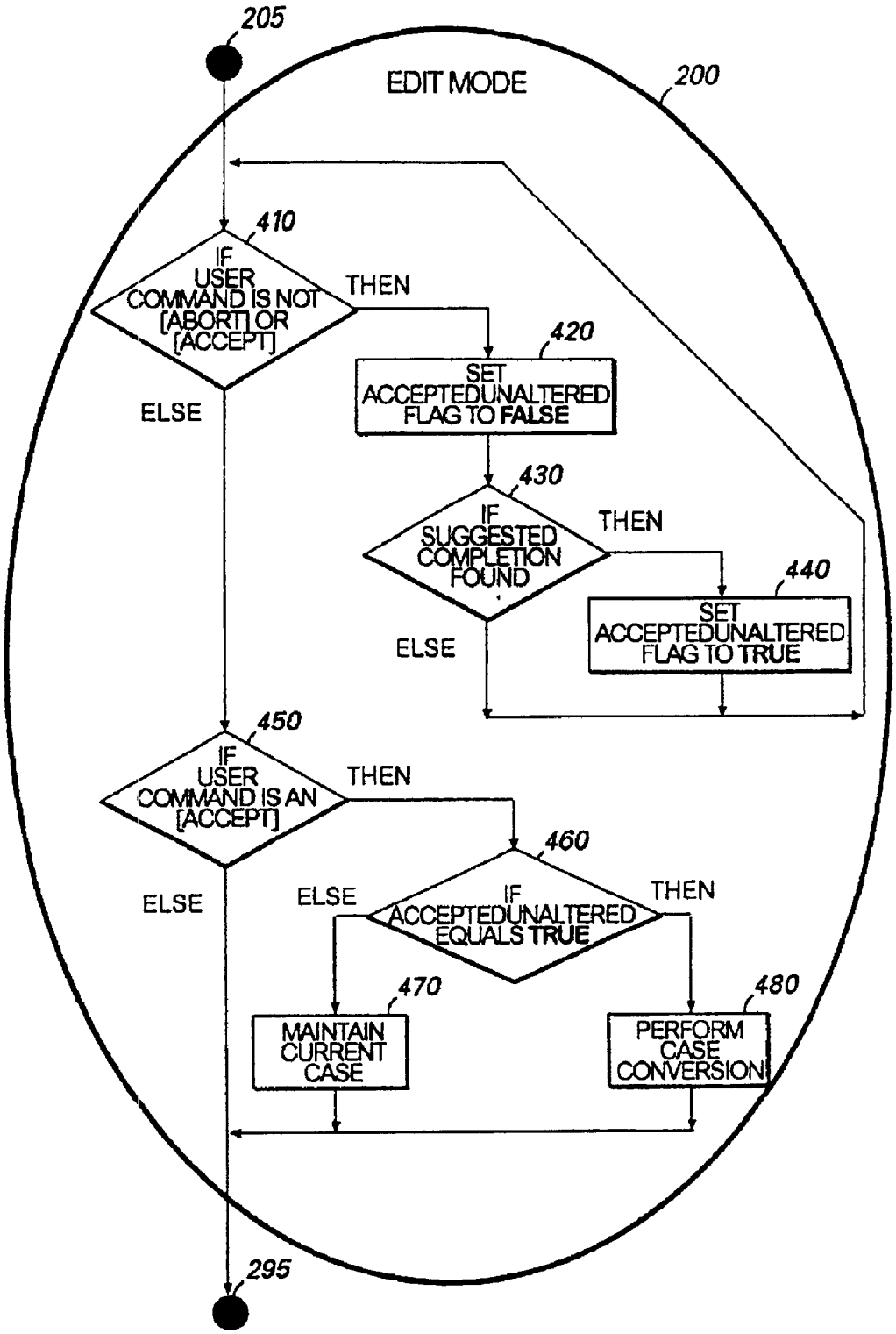
FIG. 6 is a flow chart diagram of a case conversion algorithm employed in an embodiment of the present invention.

Turning to FIG. 6, edit mode entrance point 205 indicates that the case conversion algorithm becomes active when the edit mode 200 has been entered for an active cell. The process blocks shown in FIG. 6 are executed during various states of the AutoComplete process. Overall, the case conversion algorithm maintains an "AcceptedUnaltered" flag to indicate whether or not a case conversion should be performed upon exiting the edit mode 200. When the AcceptedUnaltered flag is equated to FALSE, as in process block 420, then the case conversion will not be performed upon exiting the edit mode 200. Conversely, a value of TRUE in the AcceptedUnaltered flag will cause a case conversion to be performed. Thus, the AcceptedUnaltered flag is examined upon exiting the edit mode 200, to determine if a case conversion should be performed.

Decision block 410 illustrates that for each user command received, other than an [Abort] 620 or [Accept] 610, the THEN branch is followed. For each user command invoking the THEN branch of process block 410, the AcceptedUnaltered flag is set to FALSE as shown in process block 420. If the user command results in producing a suggested completion (i.e., for [Partial Entry] 600 commands with unique matches), the THEN branch of decision block 430 will be followed and process block 440 will set the AcceptedUnaltered flag to TRUE. If the user command does not result in finding a suggested completion, then the ELSE branch of decision block 430 is followed. In either of these cases, processing will return to decision block 410 and the next user command will be processed.

Once the [Abort] 620 or [Accept] 610 commands are received, the ELSE branch of decision block 410 will be followed and decision block 450 will be entered prior to exiting the edit mode. If the received user command was an [Accept] 610 command, then the AcceptedUnaltered flag will be examined in decision block 460 to determine if a case conversion should be performed. If the AcceptedUnaltered flag in equated to TRUE, process block 480 will be entered to perform the case conversion; however, if the AcceptedUnaltered flag is equated to FALSE, then the current case displayed in the active cell will be maintained. In either case, the edit mode for the active cell will be exited at point 295. In summary, whenever a partial entry results in producing a suggested completion, a case conversion will occur upon a subsequent [Accept] 610 command. If the user enters any command other than [Accept] 610, then the case conversion will disabled until a subsequent suggested completion is produced.

BUILD Completion List

Figure 7F:
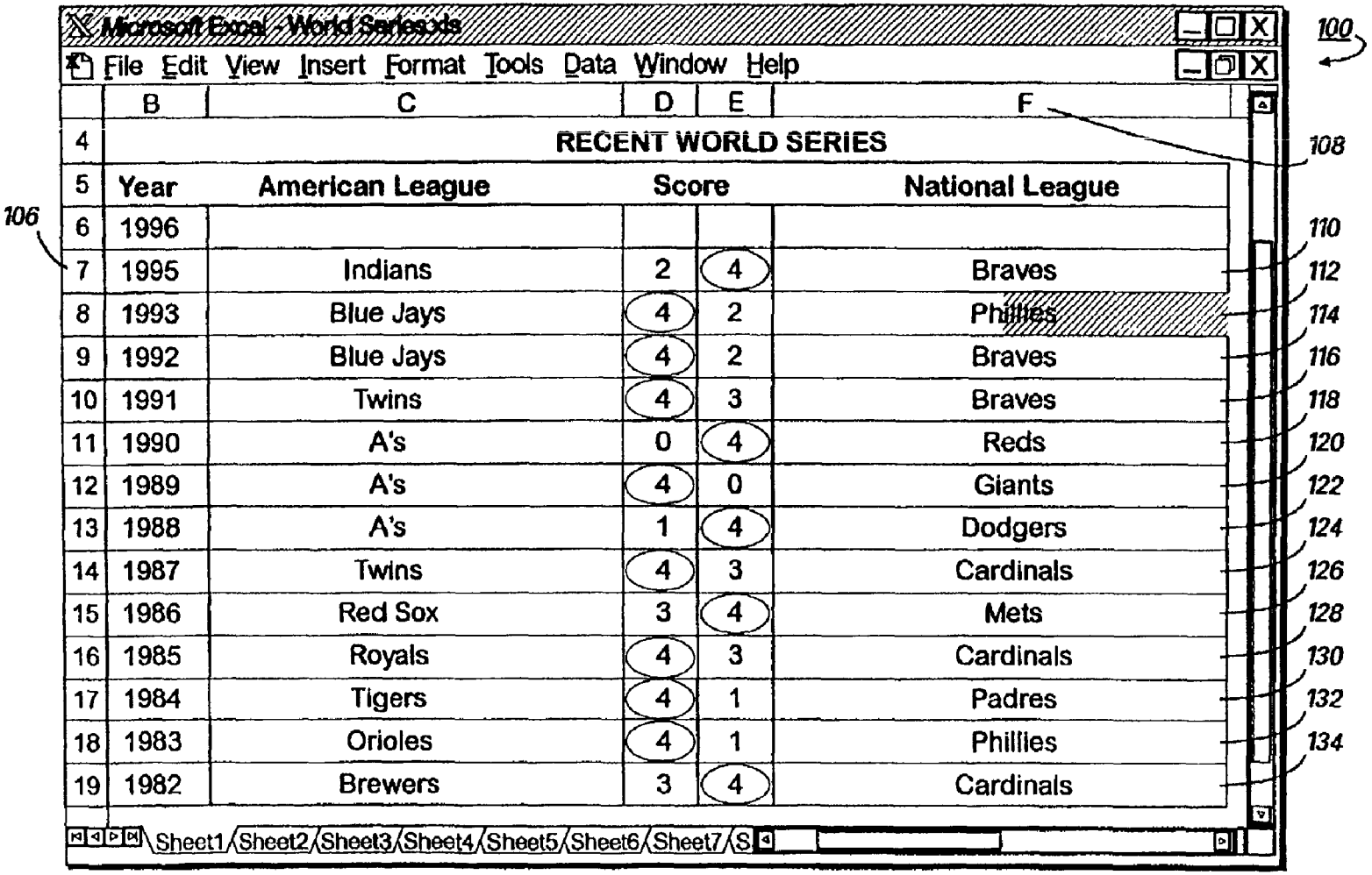
FIGS. 7a–b contain a flow chart diagram of a Generate Completion List algorithm employed by an embodiment of the present invention to build a list of completed data items for performing an AutoComplete.

Turning now to FIG. 7, the detailed operation of generating the completed data item list is shown. The completed data item list used in the AutoComplete process is a dynamic list (i.e., is built on the fly for each data entry attempt). In contrast to a static lists, a dynamic list does not require permanent memory resources. Therefore, once a data item has been entered into a cell and accepted by the user, the memory occupied by the completed data item list can be released and reallocated to other resources. The trade off in using a dynamic list rather than a static list is the processing overhead required to generate a unique list upon each entrance of the edit mode. In the preferred embodiment, this processing overhead is minimized by utilizing a tiered generation technique. This tiered technique includes building a first data item list of entries most closely associated with the active cell and, during idle time between user commands, augmenting the list with other associated data items. This process will continue until the entire list has been completed. Thus, in this tiered technique, priority is given to user input, and data entry is not delayed or "stuttered" while the data item list is being generated.

The first aspect in building the data item list is determining the particular data items that are associated with the active cell. The preferred embodiment utilizes a table determination algorithm to define the borders of a spreadsheet table. The algorithm defines a table as a set of data items surrounded by "white space" or empty cells. Ignoring certain exceptions such as text boxes, table headings, picture objects, and print area definitions, this algorithm defines a rectangular border that encompasses adjacent data items in the vertical horizontal and diagonal directions.

The process of determining the data items that are associated with an active cell can be accomplished in several ways. In the most liberal approach, all of the data items entered into a spreadsheet and any associated sheets could be considered to be associated with the active cell, and thus, become input into the data item list generation process. Although for some applications this may be a viable approach, the typical spreadsheet designer arranges associated data into columns. Hence, in the more restrictive approach, only data items in the same column and same table (using the term table as defined by the above algorithm) would be considered to be associated with the active cell. A further limitation would be to only include the block of data items that are in the same column as the active cell, encompass the active cell, and are bordered by white space. This is the approach that has been implemented in the preferred embodiment.

The second aspect in building the data item list involves applying filters to the list of associated data items. Several filtering mechanisms can be employed. A first filtering mechanism includes limiting the data items to alphabetical or alpha-numeric entries, and hence, excluding numeric entries. A second filtering mechanism is the elimination of duplicate data items from the data item list. Thus, if a data item has been entered in a column multiple times, sorting through the data item list will not be burdened by examining redundant data items. Other filtering mechanisms can include (a) limiting the data items to include only those items that have been entered more than once; (b) limiting the data items to only include data that conforms to certain formatting restrictions; and (c) limiting the data items to entries that exceed a certain number of characters. In the preferred embodiment, the filtering mechanism is limited to the elimination of duplicate data items.

Figure 7A:
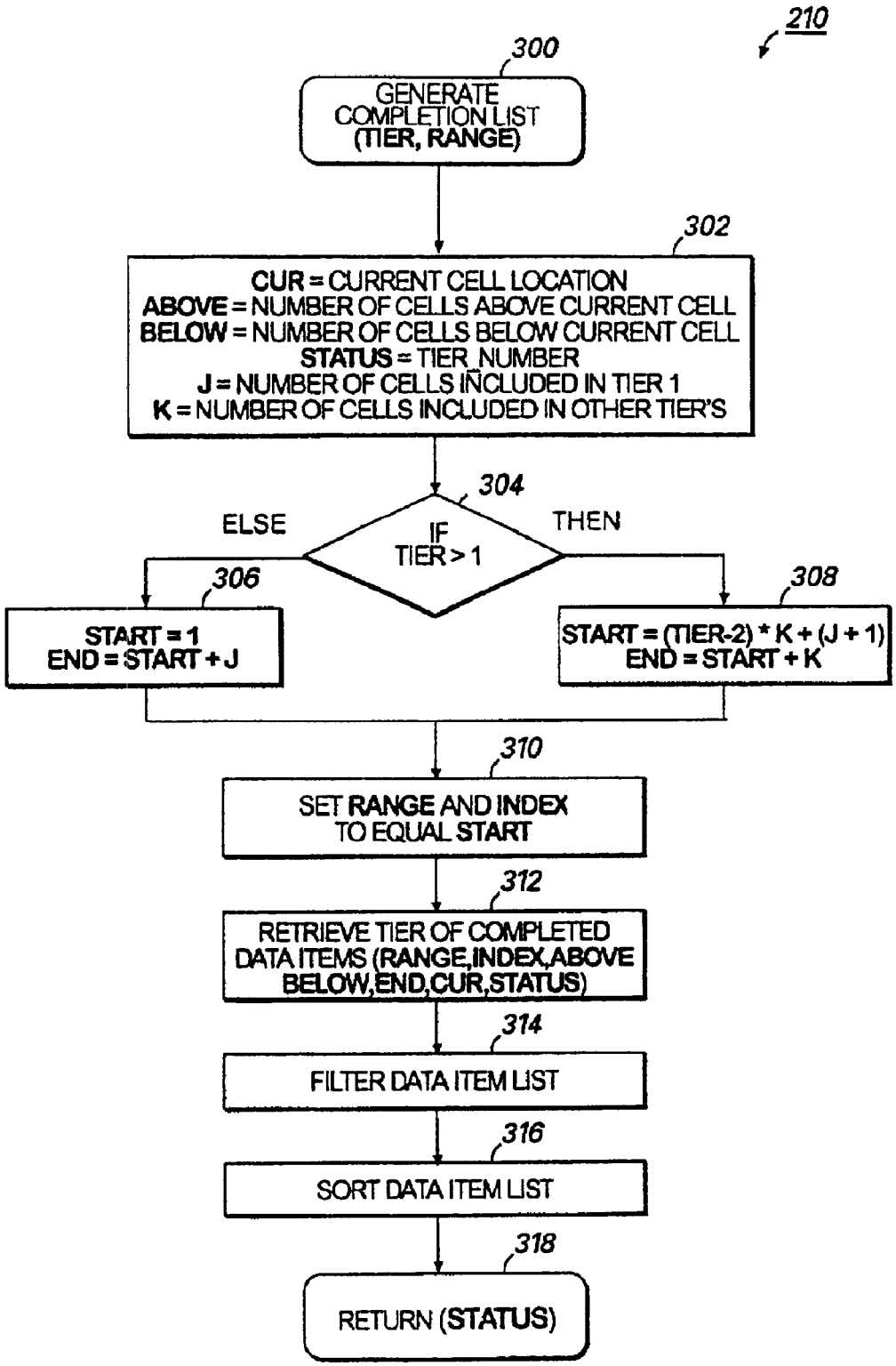
Figure 7B:
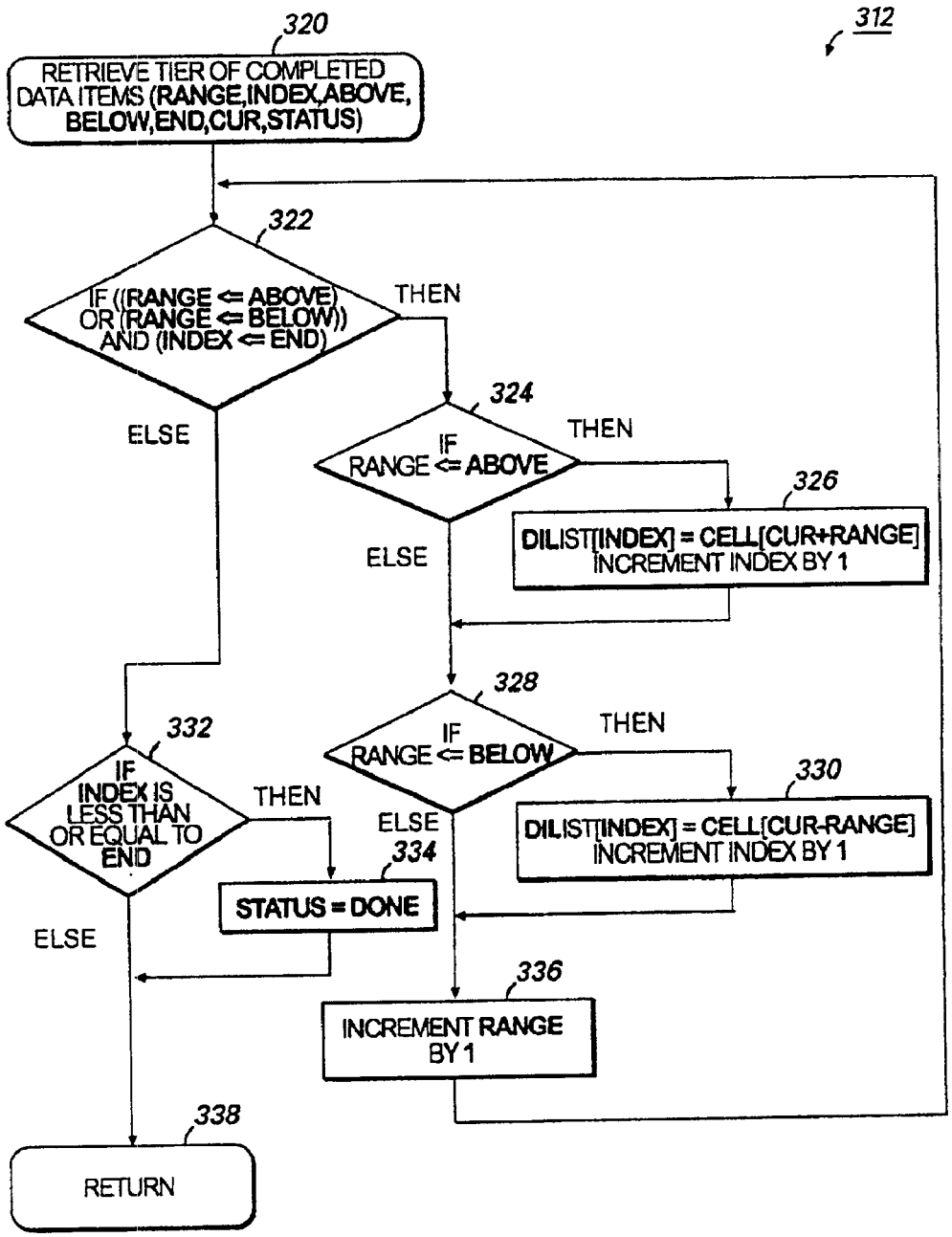

FIGS. 7a–b illustrate a possible implementation of the algorithm to generate a completion list. This algorithm is executed in the BUILD Completion List state 210 shown in FIG. 5. Entry block 300 indicates that the generate completion list algorithm is invoked with input parameters TIER and RANGE. The TIER parameter is used to identify which level of the completion list is to be generated. The purpose of RANGE will be described later. In exit block 318, the generate completion list algorithm returns the parameter STATUS. STATUS indicates whether the completed data item list has been fully generated (i.e., STATUS is equated to DONE) or if subsequent levels need to be generated (i.e., STATUS is equated to TIER). This algorithm will be invoked as many times as necessary until a completion list is generated that comprises all of the data items that are associated with the active cell.

In process block 302, the algorithm variables and parameters are initialized. The variable CUR is defined as the location of the active cell. The variables ABOVE and BELOW define the boundaries of the cells associated with the active cell. These variables are equated to the number of associated cells above and below the current cell respectively. The variable J identifies the number of cells that are to be included in the first tier or level 1 generation of the completion list. The variable K defines the number of cells included in subsequent tiers of the completion list. In the preferred embodiment the values of J and K are set to 50 and 20 respectively; however, other values for these variables can be selected and are contemplated by the present invention.

In decision block 304, the input parameter TIER is examined to determine which level of the completion list is being generated. If level 1 is being generated (TIER=1) then execution continues in process block 306. In this block two additional parameters are initialized. The START parameter is used to identify the location of the next associated cell to be included in the completion list. The parameter END is used to define the location of the last associated cell to be included in the completion list for the level being generated. In process block 306, these parameter are initialized for the first level. Thus, in the preferred embodiment the first level will include associated cells 1 to J, or the first 50 associated cells. If the TIER parameter is greater than 1 in decision block 304, then processing continues in block 308. If level 2 is being generated (TIER=2), process block 308 equates START to J plus 1 (51 in the preferred embodiment) and END is equated to START plus K. Thus, for level 2, the START and END variables are set up so as to examine the next K cells associated with the active cell (cells 51–70 in the preferred embodiment). For TIER N, cell (N−2)*20+51 and the following K−1 cells will be added to the completed data item list. Upon completion of process block 306 or 308 process block 310 will be entered.

Process block 310 initializes the INDEX variable by equating it to the value of START. INDEX is used as a counter to indicate when all of the cells for the current level have been read and is also used as a pointer in the list of completed data items to identify the location to store the next data item. Input parameter RANGE is used as a pointer to indicate the distance above and below the active cell where the next data item is to be retrieved. When entering edit mode for the active cell, the RANGE variable is equated to 1. The cells immediately above and below the active cell are at RANGE 1. The next two cells above and below the active cell are at RANGE 2. Thus, as data items are retrieved from associated cells, the RANGE variable is incremented. The value of RANGE must be retained between subsequent calls to the BUILD Completion List algorithm.

Process block 312 invokes the Retrieve Tier of Completed Data Items routine shown in FIG. 7b. This routine utilizes the variables RANGE, INDEX, ABOVE, BELOW, END, CUR, and STATUS in retrieving and building the next level of the completion list. Process block 314 applies the appropriate filters to the completed data item list. Process block 316 will sort the new filtered completed data item list in alphabetical order. Finally, exit block 318 returns the STATUS variable to the calling routine.

Turning to FIG. 7b, the details of process block 312 in FIG. 7a are provided. Entrance block 320 in FIG. 7b indicates the starting point of the routine. In process block 322 a check is performed to determine if all of the data items for the level being generated have been retrieved. This is accomplished by verifying that RANGE is less than or equal to ABOVE or BELOW and that INDEX is less than or equal to END. To illustrate the operation of these variables, FIG. 3e can be examined where active cell 112 is being edited. The associated data items in level 1 of the completed data item list include cell 110 and cells 114–134. The program variables for level 1 will be initialized as follows:

START=1

END=50

ABOVE=1 (includes cell 110)

BELOW=11 (and comprises cells 114–134)

RANGE=1

INDEX=1

Continuing with the example shown in FIG. 3e, decision block 322 in FIG. 7b determines that RANGE (equated to 1) is equal to ABOVE and less than BELOW, and that INDEX is less than END. Therefore, the THEN branch of decision block 322 will be followed and decision block 324 will be entered. In the THEN branch of decision block 322, RANGE is examined in comparison to ABOVE and BELOW to determine which associated cells should be selected. The basic premises of the algorithm is to select the next closest cell to the active cell, giving preference to cells above the active cell. For instance, when building a level of associated data items, if there are cells above and below the active cell they are selected by alternating between the cell above and the cell below the active cell. In some instances, there will be cells above the active cell but no cells below the active cell or vice versa. In this case, only the cells above or below the active cell are selected. Thus, if the bottom cell in a column is being edited, then the J cells above the active cell will be selected in the first level. Alternatively, if the top cell in a column is being edited, then the J cells below the active cell will be selected. For the example in FIG. 3e, the cells will be selected in the following order: (110, 114, 116, 118, 120 . . . 134)

In process block 324, if RANGE is less than or equal to ABOVE, then there are associated cells above the active cell. Execution then continues in process block 326 where the contents of the cell at the location of the active cell plus RANGE is loaded into the completed data item list at the location of INDEX. In addition, INDEX is incremented by 1. In decision block 324, if RANGE is greater than ABOVE, then there are no associated cells above the active cell and the ELSE branch will be followed. Whether or not process block 326 is executed, processing will continue at decision block 328. In decision block 328, if RANGE is less than or equal to BELOW, then there are associated cells below the active cell. Execution then continues in process block 330 where the contents of the cell at the location of the active cell minus RANGE is loaded in to the completed data item list at the location of INDEX. In addition, INDEX is incremented by 1. In decision block 328, if the value of RANGE is found to be greater than BELOW, then there are no associated cells below the active cell and the ELSE branch will be followed. Whether or not process block 330 is executed, processing will continue in process block 336. In process block 336, RANGE is incremented by 1 and processing returns to decision block 322.

Therefore, the overall affect of executing the THEN branch of decision block 322 is to obtain the next two completed data items associated with the active cell. In some instances, only one data item will be retrieved. This will be the case when the are no associated cells either above or below the active cell.

For the example provided in FIG. 3e, after the first execution of the THEN branch of decision block 322, the variables will be set to the following values:

START=1
END=50
ABOVE=1
BELOW=11
RANGE=2
INDEX=3

In decision block 322 for the current example, RANGE is no longer less than or equal to ABOVE. But, RANGE is less than BELOW and INDEX is less than END. Therefore, processing will continue to execute through the THEN branch of decision block 322 and returning to process block 322 until either (1) RANGE is greater than both ABOVE and BELOW, or (2) INDEX is greater than END. In the first case, the list of completed data items is fully generated. Thus, in decision block 332, INDEX will be less than END causing process block 334 to be executed, equating STATUS to DONE. In the second case, additional levels must be generated. Thus, in decision block 332, INDEX will be greater than END resulting in returning STATUS equated to the value of TIER or the level that was generated.

For the simplified example illustrated in FIG. 3e, the BUILD Completion List routine is only invoked once. Upon exiting the retrieve Tier of Completed Data Items, the completed data item list for cell 112 in FIG. 3e will contain the following entries:

Braves
Braves
Braves
Reds
Giants
Dodgers
Cardinals
Mets
Cardinals
Padres
Phillies
Cardinals The completed data item list will then be filtered in process block 314 to eliminate any surplus duplicated items. For example, the entry Braves appears in the list three (3) times. Two of these entries are considered surplus duplications and can be eliminated. After filtering, the filtered list of completed data items will contain the following entries:

Braves
Reds
Giants
Dodgers
Cardinals
Mets
Padres
Phillies

Finally, the filtered list of completed data items will be sorted alphabetically in process block 316. The sorting process can be accomplished using sorting techniques familiar to those skilled in the art such as quick sort. The resulting completed data item list is shown below:

Braves
Cardinals
Dodgers
Giants
Mets
Padres
Phillies
Reds

AutoComplete Operation

Figure 8:
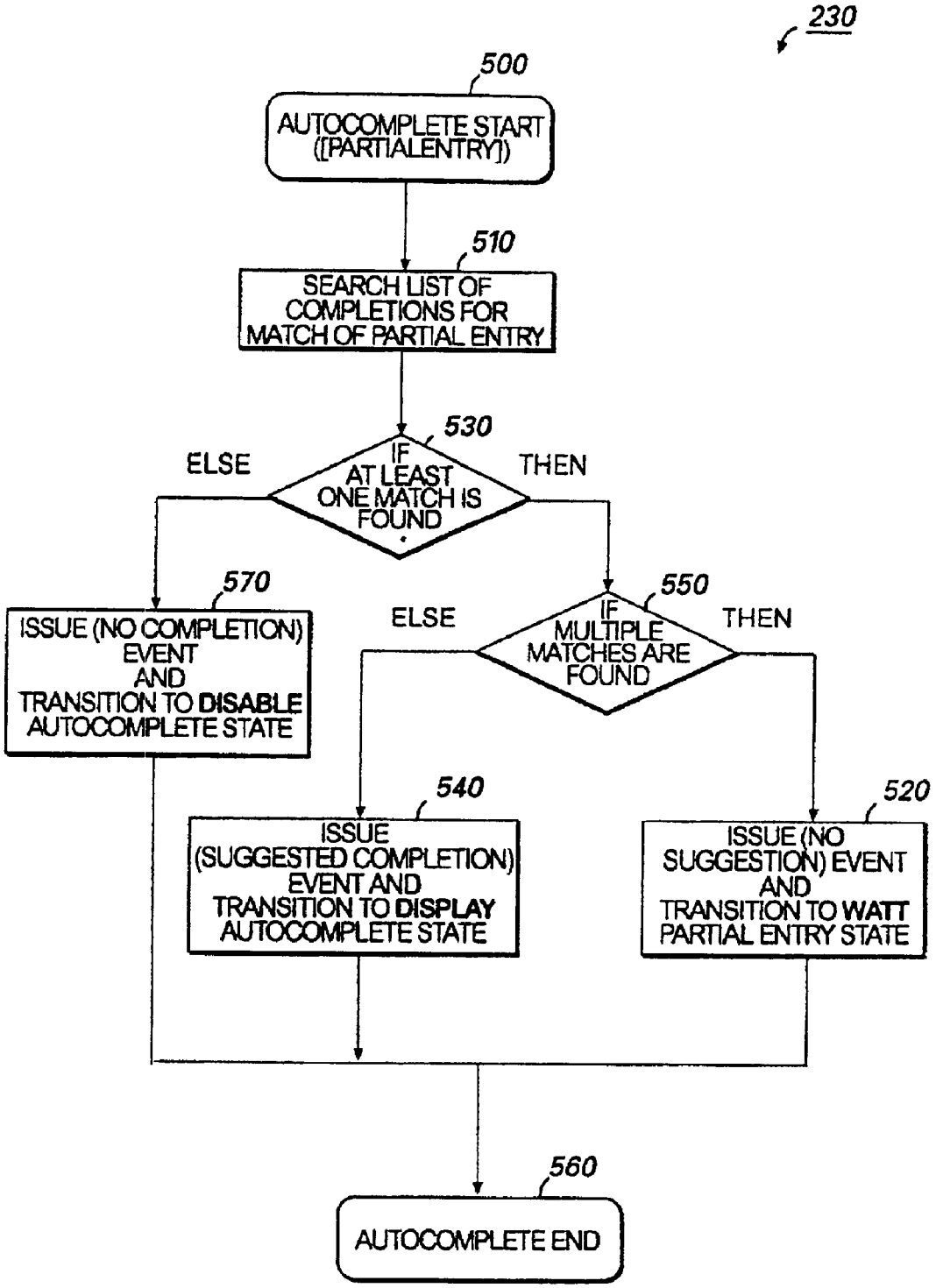
FIG. 8 is a flow chart diagram of an Attempt AutoComplete algorithm in accordance with an embodiment of the present invention.

Referring now to FIG. 8, the AutoComplete algorithm invoked in the ATTEMPT AutoComplete state 230 (shown in FIG. 5) is illustrated as a flow diagram. The ATTEMPT AutoComplete state 230 is entered from the WAIT Partial Entry state 220 or the DISPLAY Completion state 240 upon providing a partial data entry.

Entrance block 500 in FIG. 8 illustrates that the AutoComplete algorithm uses input parameter [Partial Entry] 600. In process block 510, the completed data item list is searched for items that match [Partial Entry]. The searching process can be accomplished using a binary search, sequential search, or various other searching techniques. If at least one match is found, the THEN branch of decision block 530 will be followed and decision block 550 will be entered. At decision block 550, if more than one match has been identified in the completed data item list, the THEN branch of decision block 550 will be followed and process block 520 will be entered. In block 520 the (No Suggestion) process event 750 will be issued, and a transition to the WAIT partial entry state 220 will occur. Returning to decision block 550, if only one match was identified in the completed data item list, the ELSE branch of decision block 550 will be followed and process block 540 will be entered. In process block 540, the (Suggested Completion) process event 730 will be executed and a transition to the display completion state 240 will occur.

Returning to decision block 530, if no matches are found in the completed data item list, the ELSE branch of decision block 530 will be followed and process block 570 will be entered. In process block 570, a (No Completion) process command 740 will be executed and a transition to DISABLE AutoComplete state 270 will occur. Block 560 in FIG. 8 will then be entered and the AutoComplete algorithm will be exited.

From the foregoing description, it will be appreciated that the present invention provides a method to improve the efficiency and reliability of data entry in a generic database by providing the ability for an automatic completion process utilizing a list of completed data items comprised of data associated with the item being entered. Although the present invention has been described as embodied in a spreadsheet application, it can be appreciated that the present invention can be utilized in any database storage or retrieval type application. Indeed, the present invention is not limited to any particular database or spreadsheet application.

The foregoing method of the present invention may be conveniently implemented in one or more program modules. No particular programming language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of computers and program modules that can be used to practice the instant invention, it is not practical to provide a representative example of a computer program that would be applicable to these many different systems. Each user of a particular computer would be aware of the language and tools which are more useful for that user's needs and purposes to implement the instant invention.

The present invention has been described in relation to particular embodiments which are intended in all respects to be illustrative rather than restrictive. Those skilled in the art will understand that the principles of the present invention may be applied to, and embodied in, various program modules for execution on differing types of computers regardless of database application.

Alternative embodiments will become apparent to those skilled in the art to which the present invention pertains without departing from its spirit and scope. Accordingly, the scope of the present invention is described by the appended claims and supported by the foregoing description.

What is claimed is:

1. A method for completing a partial data entry for an active cell of a spreadsheet having a plurality of cells defining a grid of rows and columns, comprising the steps of:

invoking an edit mode for said active cell;

identifying a list of completed data items from a search region within said spreadsheet comprising a table of contiguous data-containing cells encompassing said active cell and bordered by empty cells;

defining a partial data entry within said active cell;

identifying a matching completed data item from within said list of completed data items that corresponds to said partial data entry;

displaying said matching completed data item as a suggested completion for said partial data entry;

receiving an acceptance command in association with said suggested completion; and in response to said acceptance command, storing said partial data entry with said suggested completion within the active cell.

2. The method of claim 1 further comprising the steps of:

receiving a command pertinent to said suggested completion; and operating on said suggested completion in accordance with said command.

3. The method of claim 2, wherein said command is a user response and said operating step further comprises the steps of:

if said response contains a modified partial data item, verifying said suggested completion comprises said modified partial data item;

if said response is a rejection of said suggested completion, displaying said partial data entry; and if said response is a command to exit said edit mode, clearing said active cell.

4. The method of claim 1, wherein said identifying step further comprises the steps of:

retrieving a plurality of completed data items from said search region within said spreadsheet to form an associated list of completed data items;

filtering said associated list of completed data items to generate a filtered list; and sorting said filtered list to generate said list of completed data items.

5. The method of claim 4, wherein said search region within said spreadsheet is positionally based on said active cell and said identifying step further comprises the step of selecting a block of contiguous cells, said block being coterminous with said active cell.

6. The method of claim 5, wherein said block is confined to one of said columns of cells within said spreadsheet, said column containing said active cell.

7. The method of claim 5, wherein said block is confined to one of said rows of cells within said spreadsheet, said row containing said active cell.

8. The method of claim 4, wherein said filtering step further comprises the step of removing surplus duplicated completed data items from said associated list of completed data items.

9. The method of claim 4, wherein said filtering step further comprises the steps of:

removing completed data items that are not duplicated in said associated list of completed data items; and removing surplus duplicated completed data items from said associated list of completed data items.

10. The method of claim 4, wherein each of said completed data items comprises at least one glyph, and said filtering step further comprises the step of removing said completed data items that contain less than N glyphs, where N is an integer greater than one.

11. The method of claim 4, wherein each of said completed data items comprises formatting information, and said filtering step further comprises the step of removing said completed data items that do not comprise a specific formatting information.

12. The method of claim 1, wherein said identifying step further comprises the steps of:

defining a mask comprising said partial data entry;

searching said list of completed data items for at least one matching data item corresponding to said mask; and in response to finding at least one said matching data item, equating said suggested completion to said matching data item.

13. The method of claim 1, wherein said identifying step further comprises the steps of:

defining a mask comprising said partial data entry;

searching said list of completed data items for at least one matching data item corresponding to said mask; and in response to finding more than one or said matching data items, defering identification of said suggested completion.

14. The method of claim 1, wherein said identifying step further comprises the steps of:

defining a mask comprising said partial data entry;

searching said list of completed data items for at least one matching data item corresponding to said mask; and in response to not finding said matching data item, disabling any further searches of said list of completed data items for said active cell.

15. The method of claim 14 further comprising the step of re-enabling searches of said list of completed data items for said active cell.

16. The method of claim 1, wherein said displaying step further comprises the step of replacing said partial data entry in said active cell with said suggested completion.

17. The method of claim 16, wherein said displaying step further comprises distinguishing a first portion of said suggested completion that comprises said partial data item from a second portion of said suggested completion that does not comprise said partial data entry.

18. The method of claim 1, further comprising the step of operating on said suggested completion in accordance with said acceptance command to perform a case conversion, said case conversion comprising an adjustment of the case of said partial entry to correspond to the case of said suggested completion.

19. In a program module responsive to input commands for manipulation of data items presented in a plurality of cells, a method to generate a list of completed data items from a search region of cells that are positionally associated with an active cell, comprising the steps of:

identifying a list of completed data items from said search region within a spreadsheet comprising a table of contiguous data-containing cells encompassing said active cell and bordered by empty cells;

generating a sub-list of completed data items from a sub-range of cells that are within said search region encompassing said active cell; and when said program module is not processing said input commands, expanding said sub-list of completed data items to comprise all of said table of contiguous data-containing cells within said search region.

20. The method of claim 19, wherein said identifying step further comprises the steps of:

selecting all cells that border said active cell and contain completed data items to form a selected cell list; and adding to said selected cell list all cells that border cells in said selected cell list and contain completed data items.

21. The method of claim 19, wherein said completed data items comprise at least one character and said identifying step further comprises the steps of:

selecting a set of J cells from said search region;

filtering surplus duplicated completed data items from said set of J cells to generate a filtered sub-list; and sorting said filtered sub-list alphabetically.

22. The method of claim 19, wherein said expanding step further comprises the steps of:

(a) selecting a set of K cells from said search region, said set excluding cells contained in said sub-list;

(b) filtering surplus duplicated completed data items from said set of K cells to generate a filtered set;

(c) merging said filtered set into said sub-list;

(d) sorting said sub-list alphabetically; and (e) repeating steps (a)–(d) until said sub-list comprises all of said table of contiguous data-containing cells within said search region.

23. In a program module responsive to input commands for manipulation of data items presented in a plurality of cells, a method to automatically complete a partial data entry in said active cell comprising the steps of:

invoking an edit mode for said active cell, said edit mode enabling said active cell to receive said partial data entry and a suggested completion;

identifying a list of completed data items from a search region within a spreadsheet comprising a table of contiguous data-containing cells encompassing said active cell and bordered by empty cells;

filtering surplus duplicated completed data items from said list of completed data items to generate a filtered list;

sorting said filtered list alphabetically to generate a suggestion list of completed data items;

receiving said partial data entry and displaying said partial data entry in said active cell;

searching said suggestion list to identify at least one suggested completion comprising said partial data entry;

in response to identifying only one said suggested completion, replacing said partial data entry in said active cell with said suggested completion;

receiving a response concerning said suggested completion; and operating on said suggested completion in accordance with said response.

24. The method of claim 23, wherein said identifying step further comprises the steps of:

selecting all cells that border said active cell and contain completed data items to form a selected cell list; and adding to said selected cell list, all cells that border cells in said selected cell list and contain completed data items.

25. The method of claim 24, wherein said cells are arranged in a grid of rows and columns on multiple work pages and said search region comprises cells from at least one of said work pages, and wherein cells sharing a common row are aligned in the X direction, cells sharing a common column are aligned in the Y direction, and cells sharing a common (X, Y) coordinate but are located on separate work pages are aligned in the Z direction, and any pair of cells border each other if they are adjacent to each other in the X, Y or Z directions.

26. A method for entering data items in a spreadsheet program, comprising the steps of:

selecting an active cell within a search region comprising a table of contiguous data-containing cells encompassing said active cell and bordered by empty cells;

enabling said active cell to receive a partial data entry and a suggested completion;

entering said partial data item in said active cell;

receiving said suggested completion selected from said search region; and accepting said suggested completion.

27. A computer-readable medium on which is stored a computer program for automatically providing a suggested completion for a partial data entry, said computer program comprising instructions which, when executed by said computer, perform the steps of:

enabling an active cell to receive said partial data entry, said active cell being selected from a plurality of cells in response to placing a display item into a region occupied by said active cell;

identifying a list of completed data items from a search region within a spreadsheet comprising a table of contiguous data-containing cells encompassing said active cell and bordered by empty cells;

receiving said partial data entry and displaying said partial data entry within said active cell;

searching said list of completed data items to identify said suggested completion comprising said partial data entry; and in response to identifying said suggested completion, displaying said suggested completion within said active cell.

28. The computer-readable medium of claim 27 wherein said computer program further performs the steps of:

receiving a response pertinent to said suggested completion;

if said response is an acceptance of said suggested completion, storing said suggested completion as said data entry;

if said response contains a modified partial data item, searching said list to identify a suggested completion comprising said modified partial data item;

if said response is a rejection of said suggested completion, displaying said partial data item; and if said response is a command to exit said edit mode, clearing said active cell.

29. The computer-readable medium of claim 27, wherein said search region is positionally based and said identifying step further comprises the steps of:

retrieving a plurality of completed data items from a block of contiguous cells, said block being coterminous with said active cell, and forming said list of completed data items;

removing surplus duplicated completed data items from said list of completed data items; and sorting said list of completed data items alphabetically, said completed data items containing at least one glyph from a set of glyphs having an alphabetical relationship.

30. The computer-readable medium of claim 27, wherein said searching step further comprises the steps of:

defining a mask comprising said partial data entry;

searching said list of completed data items for at least one matching data item corresponding to said mask;

equating said suggested completion to said matching data item if only one said matching data item is found;

defer identifying said suggested completion if more than one of said matching data items is found; and disabling any further searches of said list of completed data items for said active cell if a matching data item is not found.

31. The computer-readable medium of claim 27, wherein said displaying step further comprises the step of replacing said partial data entry in said active cell with said suggested completion.

32. The computer-readable medium of claim 27, further comprising the step of operating on said suggested completion in accordance with said acceptance command to perform a case conversion, said case conversion comprising an adjustment of the case of said partial entry to correspond to the case of said suggested completion.

33. A computer system for completing a data entry for an active cell of a spreadsheet, comprising:

a processing unit;

a memory storage device;

an input device coupled to said processing unit for receiving data;

a pixel-based display device coupled to said processing unit for displaying data;

a program module, stored in said memory storage device for providing instructions to said processing unit;

said processing unit, responsive to said instructions of said program module, operative to:

enable an active cell to accept a partial data entry, said active cell being selected from a plurality of cells in response to moving a display item into a region occupied by said active cell;

identifying a list of completed data items from a search region within a spreadsheet comprising a table of contiguous data-containing cells encompassing said active cell and bordered by empty cells;

receive a partial data entry from said input device;

display said partial entry within said active cell on said pixel-based display device;

search said list of completed data items to identify a suggested completion comprising said partial data entry; and in response to identifying said suggested completion, display said suggested completion within said active cell on said pixel-based display device.

34. The computer system of claim 33, wherein said processing unit is further operative to:

receive a response pertinent to said suggested completion;

if said response is an acceptance of said suggested completion, store said suggested completion in said active cell as said data entry;

if said response contains a modified partial data item, search said list to identify a suggested completion comprising said modified partial data item;

if said response is a rejection of said suggested completion, display said partial data item; and if said response is a command to exit said edit mode, clear said active cell.

35. The computer system of claim 33, wherein said search region is positionally based and said processing unit is operative to identify a list of completed data items by:

retrieving a plurality of completed data items from a block of contiguous cells, said block being coterminous with said active cell, and forming said list of completed data items;

removing surplus duplicated completed data items from said list of completed data items; and sorting said list of completed data items alphabetically, said completed data items containing at least one glyph from a set of glyphs having an alphabetical relationship.

36. The computer system of claim 33, wherein said processing unit conducts a search of said list of completed data items by:

defining a mask comprising said partial data entry;

searching said list of completed data items for at least one matching data item corresponding to said mask;

equating said suggested completion to said matching data item if only one said matching data item is found;

deferring to identify said suggested completion if more than one of said matching data items is found; and disabling any further searches of said list of completed data items for said active cell if a matching data item is not found.

37. The computer system of claim 33, wherein said processing unit displays said suggested completion by replacing said partial data entry in said active cell with said suggested completion.

38. The computer system of claim 33, wherein said response is an acceptance of said suggested completion and said processing unit operates on said suggested completion in accordance with said response by performing a case conversion, said case conversion comprising an adjustment of the case of said partial item to correspond to the case of said suggested completion.

*39. A method for completing a partial data entry for an active cell of a spreadsheet having a plurality of cells defining a grid of rows and columns, the method comprising:*

*invoking an edit mode for the active cell;*

*identifying a list of completed data items from a search region within the spreadsheet, said search region including one (1) cells sharing the same column as the active cell, (2) cells sharing the same row as the active cell, (3) cells within the same column as the active cell and within a range of N cells from the active cell, wherein N is an integer greater than zero, and (4) cells within the same row as the active cell and within a range of N cells from the active cell, wherein N is an integer greater than zero;*

*defining a partial data entry within the active cell;*

*identifying a matching completed data item from within said list of completed data items that corresponds to said partial data entry;*

*displaying said matching completed data item as a suggested completion command for said partial data entry;*

*receiving an acceptance command in association with said suggested completion; and*

*in response to said acceptance command, storing said partial data entry with said suggested completion within the active cell.*

*40. The method of claim 39, further comprising:*

*receiving a command pertinent to said suggested completion; and*

*operating on said suggested completion in accordance with said command.*

*41. The method of claim 40, wherein said command is a user response and said operating operation further comprises:*

*if said response contains a modified partial data item, verifying said suggested completion comprises said modified partial data item;*

*if said response is a rejection of said suggested completion, displaying said partial entry; and*

*if said response is a command to exit said edit mode, clearing the active cell.*

*42. The method of claim 39, wherein said identifying a list of completed data items operation further comprises:*

*retrieving a plurality of completed data items from said search region within the spreadsheet to form an associated list of completed data items;*

*filtering said associated list of completed data items to generate a filtered list; and*

*sorting said filtered list to generate said list of completed data items.*

*43. The method of claim 42, wherein said search region within the spreadsheet is positionally based on the active cell and said identifying a list of completed data items operation further comprises selecting a block of contiguous cells, said block being coterminous with the active cell.*

*44. The method of claim 43, wherein said block is confined to one of the columns of cells within the spreadsheet, said column containing the active cell.*

*45. The method of claim 43, wherein said block is confined to one of the rows of cells within the spreadsheet, said row containing the active cell.*

*46. The method of claim 42, wherein said filtering operation further comprises removing surplus duplicated completed data items from said associated list of completed data items.*

*47. The method of claim 42, wherein said filtering operation further comprises:*

*removing completed data items that are not duplicated in said associated list of completed data items; and*

*removing surplus duplicated completed data items from said associated list of completed data items.*

*48. The method of claim 42, wherein each of said completed data items comprises at least one glyph, and said filtering operation further comprises removing completed data items that contain less than N glyphs, where is an integer greater than one.*

*49. The method of claim 42, wherein said completed data items comprises formatting information, and said filtering operation further comprises removing completed data items that do not comprise a specific formatting information.*

*50. The method of claim 42, wherein said displaying operation further comprises distinguishing a first portion of said suggested completion that comprises said partial data item from a second portion of said suggested completion that does not comprise said partial data entry.*

*51. The method of claim 39, wherein said identifying a list of completed data items operation further comprises:*

*defining a mask comprising said partial data entry;*

*searching said list of completed data items for at least one matching data item corresponding to said mask; and*

*in response to finding at least one said matching data item, equating said suggested completion to said matching data item.*

*52. The method of claim 39, wherein said identifying a list of completed data items operation further comprises:*

*defining a mask comprising said partial data entry;*

*searching said list of completed data items for at least one matching data item corresponding to said mask; and*

*in response to finding more than one of said matching data items, deferring identification of said suggested completion.*

*53. The method of claim 39, wherein said identifying a list of completed data items operation further comprises:*

*defining a mask comprising said partial data entry;*

*searching said list of completed data items for at least one matching data item corresponding to said mask; and*

*in response to not finding said matching data item, disabling any further searches of said list of completed data items for the active cell.*

*54. The method of claim 53, further comprising re-enabling searches of said list of completed data items for the active cell.*

*55. The method of claim 39, wherein said displaying operation further comprises replacing said partial data entry in the active cell with said suggested completion.*

*56. The method of claim 39, further comprising operating on said suggested completion in accordance with said acceptance command to perform a case conversion, said case conversion comprising an adjustment of the case of said partial entry to correspond to the case of said suggested completion.*

*57. A method for completing a partial data entry for an active cell of a spreadsheet having a plurality of cells defining a grid of rows and columns, the method comprising:*

*invoking an edit mode for the active cell;*

*identifying a list of completed data items from a search region within the spreadsheet, said search region including cells within the same column as the active cell;*

*defining a partial data entry within the active cell;*

*identifying a matching completed data item from within said list of completed data items that corresponds to said partial data entry;*

*displaying said matching completed data item as a suggested completion command for said partial data entry;*

*receiving an acceptance command in association with said suggested completion; and*

*in response to said acceptance command, storing said partial data entry with said suggested completion within the active cell.*

*58. The method of claim 57, wherein said search region is further limited to a range of N cells from the active cell, wherein N is an integer greater than zero.*

*59. A method for completing a partial data entry for an active cell of a spreadsheet having a plurality of cells defining a grid of rows and columns, the method comprising:*

*invoking an edit mode for the active cell;*

*identifying a list of completed data items from a search region within the spreadsheet, said search region including cells within the same row as the active cell;*

*defining a partial data entry within the active cell;*

*identifying a matching completed data item from within said list of completed data items that corresponds to said partial data entry;*

*displaying said matching completed data item as a suggested completion command for said partial data entry;*

*receiving an acceptance command in association with said suggested completion; and*

*in response to said acceptance command, storing said partial data entry with said suggested completion within the active cell.*

*60. The method of claim 59, wherein said search region is further limited to a range of N cells from the active cell, wherein N is an integer greater than zero.*

* * * * *

UNITED STATES PATENT AND TRADEMARK OFFICE

CERTIFICATE OF CORRECTION

PATENT NO. : RE39,326 E
APPLICATION NO. : 09/728000
DATED : October 3, 2006
INVENTOR(S) : Ross Ward Comer et al.

It is certified that error appears in the above-identified patent and that said Letters Patent is hereby corrected as shown below:

In column 29, line 26, in Claim 39, after “one” insert -- of --.

Signed and Sealed this
Twenty-sixth Day of July, 2011

David J. Kappos

David J. Kappos
*Director of the United States Patent and Trademark Office*